United States Patent
Nam

(10) Patent No.: US 11,816,299 B2
(45) Date of Patent: Nov. 14, 2023

(54) FOLDABLE DISPLAY DEVICE

(71) Applicant: SAMSUNG DISPLAY CO., LTD., Yongin-si (KR)

(72) Inventor: Hosung Nam, Seoul (KR)

(73) Assignee: SAMSUNG DISPLAY CO., LTD., Yongin-si (KR)

(\*) Notice: Subject to any disclaimer, the term of this patent is extended or adjusted under 35 U.S.C. 154(b) by 0 days.

(21) Appl. No.: 17/938,117

(22) Filed: Oct. 5, 2022

(65) Prior Publication Data

US 2023/0176700 A1 Jun. 8, 2023

(30) Foreign Application Priority Data

Dec. 7, 2021 (KR) .......................... 10-2021-0174220

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/04164* (2019.05); *G06F 2203/04102* (2013.01)

(58) Field of Classification Search
CPC .. G06F 3/0412; G06F 3/0445; G06F 3/04164; G06F 2203/04102
USPC ................................................. 345/173, 174
See application file for complete search history.

(56) References Cited

U.S. PATENT DOCUMENTS

| | | | | |
|---|---|---|---|---|
| 10,595,408 | B2* | 3/2020 | Lim | ........................ H05K 1/111 |
| 10,976,873 | B2* | 4/2021 | Shin | ....................... G06F 1/1643 |
| 11,132,020 | B2 | 9/2021 | Kim et al. | |
| 2017/0061836 | A1* | 3/2017 | Kim | ....................... G06F 1/1626 |
| 2021/0173437 | A1 | 6/2021 | Bae et al. | |
| 2022/0043481 | A1 | 2/2022 | Shin et al. | |

FOREIGN PATENT DOCUMENTS

| | | |
|---|---|---|
| KR | 10-2018-0059647 | 6/2018 |
| KR | 10-2020-0084495 | 7/2020 |
| KR | 10-2020-0121519 | 10/2020 |
| KR | 10-2020-0122688 | 10/2020 |
| KR | 10-2020-0124099 | 11/2020 |
| KR | 10-2021-0073699 | 6/2021 |

\* cited by examiner

*Primary Examiner* — Calvin C Ma
(74) *Attorney, Agent, or Firm* — F. CHAU & ASSOCIATES, LLC

(57) ABSTRACT

A foldable display device includes a display panel including a first non-folding area, a second non-folding area, and a folding area disposed between the first and second non-folding areas and a digitizer including a first sensing portion, a second sensing portion spaced apart from the first sensing portion in the folding area, and a connection portion extending from one end of the first sensing portion to one end of the second sensing portion. The connection portion includes a first portion extending from the first sensing portion, a second portion extending from the second sensing portion, one or more third portions disposed between the first and second portions and including first and second areas facing each other and a third area disposed between the first and second areas, and a fourth portion disposed between the first and third portions, between the second and third portions, or between two third portions adjacent to each other.

24 Claims, 18 Drawing Sheets

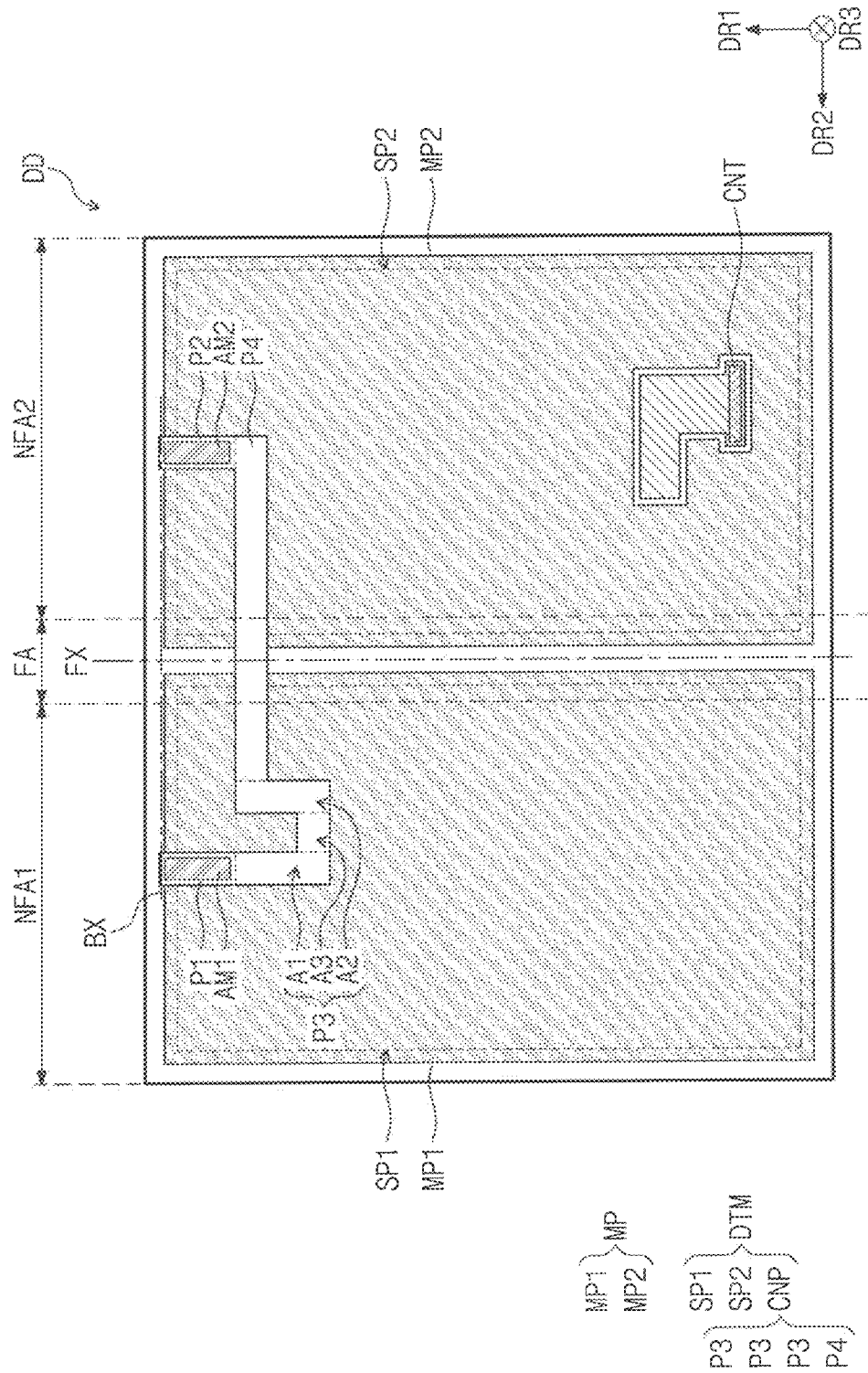

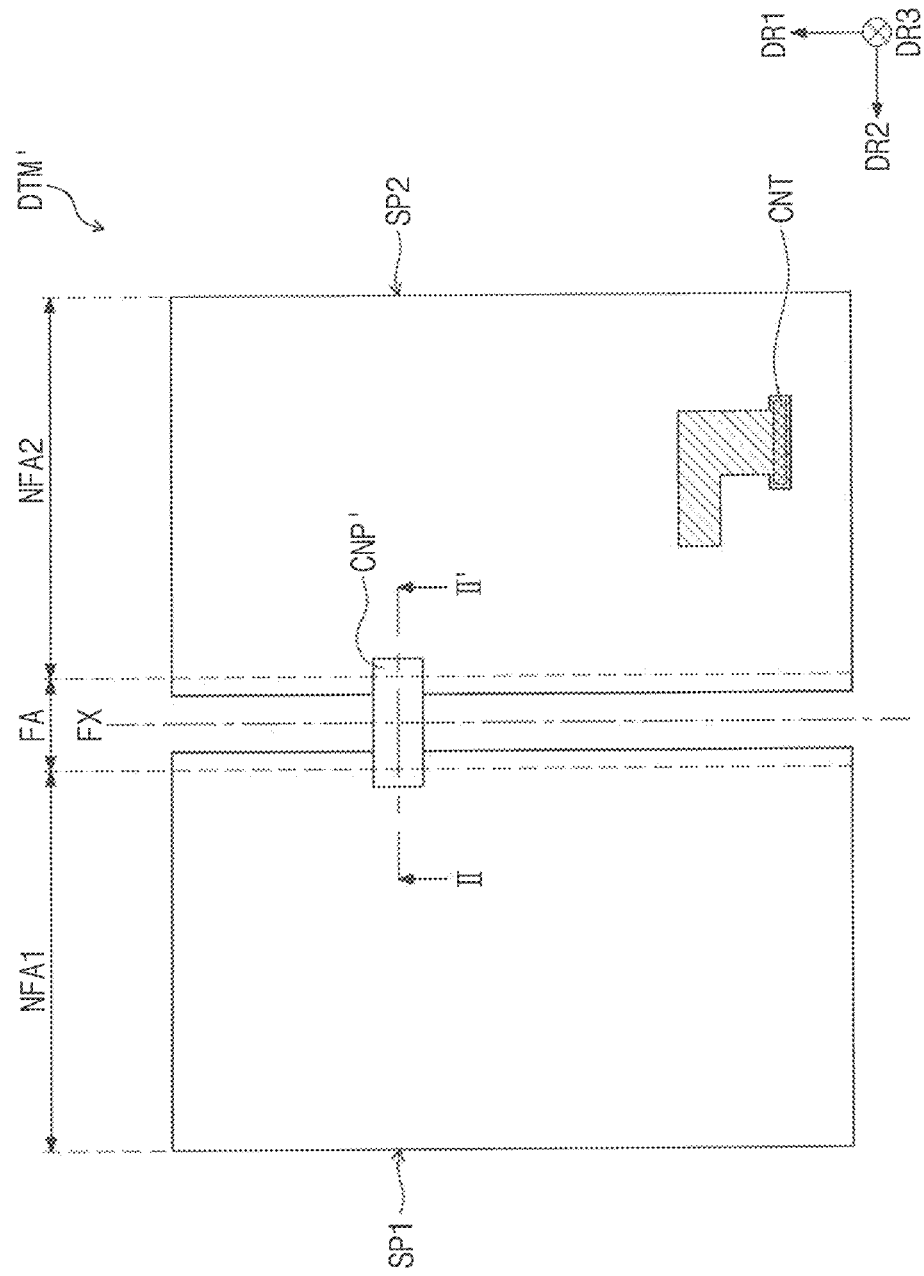

FOLDABLE DISPLAY DEVICE

CROSS-REFERENCE TO RELATED APPLICATIONS

This U.S. non-provisional patent application claims priority under 35 U.S.C. § 119 to Korean Patent Application No. 10-2021-0174220, filed on Dec. 7, 2021, in the Korean Intellectual Property Office, the disclosure of which is incorporated by reference herein in its entirety.

TECHNICAL FIELD

Embodiments of the inventive concept relate to a foldable display device

DISCUSSION OF THE RELATED ART

A display device includes a display area activated in response to electrical signals. The display device senses inputs applied thereto primarily through contact from an outside source via the display area and, in response, the display device displays a variety of images to provide information to a user. In recent years, as display devices of various shapes are being developed, these devices have been implemented with display areas of various shapes. In addition, the development of display devices whose shape is able to be changed in various ways has resulted in both improved portability for the user and more efficient utilization of residential space.

SUMMARY

An embodiment of the inventive concept provides a foldable display device including a digitizer with simplified processing and improved sensing reliability.

Embodiments of the inventive concept provide a foldable display device including a display panel including a first non-folding area, a second non-folding area, and a folding area folded with respect to a folding axis extending in a first direction and disposed between the first non-folding area and the second non-folding area and a digitizer disposed under the display panel and including a first sensing portion, a second sensing portion spaced apart from the first sensing portion in the folding area, and a connection portion extending from one end of the first sensing portion to one end of the second sensing portion. The connection portion includes a first portion extending from the first sensing portion, a second portion extending from the second sensing portion, n, third portions (where n is a natural number equal to or greater than 1) disposed between the first portion and the second portion and including a first area, a second area facing the first area, and a third area disposed between the first area and the second area, and a fourth portion disposed between the first portion and the n third portions, between the second portion and one or more third portions, or between two third portions adjacent to each other among the n third portions.

Each of the first sensing portion and the second sensing portion includes an upper surface facing the display panel and a lower surface opposite the upper surface The first portion is adjacent to the first sensing portion and the second portion is adjacent to the second sensing portion. The first portion is bent in a direction toward the lower surface of the first sensing portion with respect to a bending axis extending in a second direction crossing over the first direction with respect to a bending axis extending in a second direction crossing over the first direction. The second portion is bent in a direction towards the lower surface of the second sensing portion with respect to a bending axis extending in a second direction crossing over the first direction.

The foldable display device further includes a lower support plate including a first support plate disposed under the first sensing portion and a second support plate disposed under the second sensing portion and a lower adhesive layer disposed adjacent to a bent portion of the first portion and the second portion. The first portion and the second portion are respectively attached to the first support plate and the second support plate by the lower adhesive layer.

The foldable display device further includes a connector disposed in the second sensing portion. The digitizer includes first sensing coils and second sensing coils disposed on a layer different from a layer on which the first sensing coils are disposed and insulated from the first sensing coils while crossing over the first sensing coils, third sensing coils and fourth sensing coils disposed on a layer different from a layer on which the third sensing coils are disposed and insulated from the third sensing coils while crossing over the third sensing coils, first signal lines connecting the first and second sensing coils to the connector, and second signal lines connecting the third and fourth sensing coils to the connector, and the first signal lines extend from the first sensing portion to the second sensing portion via the connection portion and are connected to the connector. The first sensing coils and the second sensing coils are disposed in the first sensing portion, and the third sensing coils and the fourth sensing coils are disposed in the second sensing portion.

The first signal lines are disposed in the connection portion and have a single-layer structure.

Each of an internal angle between the first area and the third area of each of the n third portions and an internal angle between the second area and the third area of each of the one or more third portions increases when the display panel is changed from an unfolded state to a folded state.

The connection portion has a width equal to or greater than about 10 micrometers and equal to or less than about 50 micrometers when viewed in a plane.

Each of the third area and the fourth portion extends in a direction substantially perpendicular to the first direction when the first portion and the first area extending from the first portion extend in a same direction and/or the second portion and the second area extending from the second portion extend in a same direction.

In the case where there is a single third portion, the first area extends from the first portion, and the fourth portion extends from the second portion to the second area and crosses the folding axis.

The first area of one of the one or more third portions extends from the first portion, the second area of another of the third portions extends from the second portion, and the third area of the another third portion crosses the folding axis.

Each of the one or more third portions includes a first third portion extending from the first portion, an "n-th" third portion extending from the second portion, and an "i-th" third portion (where 2<i<n−1) and where a third area of one of the "i-th" third portions crosses over the folding axis.

The third area extends in the first direction when the first portion and the first area extending from the first portion extend in different directions from each other.

The fourth portion includes a first extension portion extending from the second area in a direction substantially perpendicular to the first direction and crossing over the folding axis and a second extension portion extending from the second portion to the first extension portion along the first direction.

Each of the first sensing portion and the second sensing portion includes a base layer, a first metal layer disposed on the base layer, a first cover layer disposed on the base layer and covering the first metal layer, a second metal layer disposed below the base layer, and a second cover layer disposed below the base layer and covering the second metal layer.

The foldable display device further includes a support layer disposed between the display panel and the digitizer. The support layer includes a first support portion overlapping the first non-folding area, a second support portion overlapping the second non-folding area, and a folding portion disposed between the first support portion and the second support portion and overlapping the folding area, and the folding portion is provided with a plurality of openings arranged in a lattice shape when viewed in a plane.

The foldable display device further includes an insulating layer including a first insulating portion disposed under the first sensing portion and a second insulating portion disposed under the second sensing portion and spaced apart from the first insulating portion in the folding area and a lower support plate including a first support plate disposed under the first insulating portion and a second support plate disposed under the second insulating portion and spaced apart from the first support plate in the folding area.

Embodiments of the inventive concept provide a foldable display device including a display panel including a first non-folding area, a second non-folding area, and a folding area folded with respect to a folding axis extending in a first direction and disposed between the first non-folding area and the second non-folding area and a digitizer disposed under the display panel and including a first sensing portion, a second sensing portion spaced apart from the first sensing portion in the folding area, and a connection portion extending from one end of the first sensing portion to one end of the second sensing portion, which faces the one end of the first sensing portion with the folding axis interposed therebetween. The connection portion includes a protruding area spaced apart from the first sensing portion and the second sensing portion and protruded in a thickness direction of the display panel, a first intermediate area extending from the one end of the first sensing portion to the protruding area, and a second intermediate area extending from the one end of the second sensing portion to the protruding area when the display panel is unfolded.

The foldable display device further includes a connector disposed in the second sensing portion. The digitizer includes first sensing coils and second sensing coils disposed on a layer different from a layer on which the first sensing coils are disposed and insulated from the first sensing coils while crossing over the first sensing coils, third sensing coils and fourth sensing coils disposed on a layer different from a layer on which the third sensing coils are disposed and insulated from the third sensing coils while crossing over the third sensing coils, first signal lines connecting the first and second sensing coils to the connector, and second signal lines connecting the third and fourth sensing coils to the connector, and the first signal lines extend from the first sensing portion to the second sensing portion via the connection portion and are connected to the connector. The first sensing coils and the second sensing coils are disposed in the first sensing portion, and the third sensing coils and the fourth sensing coils are disposed in the second sensing portion.

The protruding area is disposed lower than the first sensing portion when viewed in a thickness direction from the top surface of the display panel DP, and the second sensing portion and extends in a second direction crossing over the first direction, and each of an internal angle between the first sensing portion and the first intermediate area and an internal angle between the second sensing portion and the second intermediate area is equal to or less than about 90 degrees.

Each of the internal angle between the first sensing portion and the first intermediate area and the internal angle between the second sensing portion and the second intermediate area is larger when the display panel is folded than when the display panel is unfolded.

The foldable display device further includes at least one of a protective member and a reinforcing member. The protruding area includes an upper surface adjacent to the first and second sensing portions and a lower surface opposite to the upper surface, the protective member is disposed on the upper surface and includes an organic material, and the reinforcing member is disposed on the lower surface and includes a metal material.

The protruding area includes a curved portion, the protruding area further includes a first protruding area and a second protruding area facing the first protruding area, and the protruding area comprises a curved portion and an angle of the curved portion when the display panel is folded is larger than the angle of the curved portion when the display panel is unfolded.

The first protruding area extends from the first intermediate area in a second direction crossing over the first direction, the second protruding area extends from the second intermediate area towards the second direction and faces the first protruding area in a thickness direction of the display panel, and the protruding area further includes a third protruding area extending from one end of the first protruding area, which is spaced apart from the first intermediate area, to one end of the second protruding area, which is spaced apart from the second intermediate area.

The connection portion has a width equal to or greater than about 10 micrometers and equal to or less than about 50 micrometers in the first direction when viewed in a plane.

According to the above, the difference in performance between the sensing portions spaced apart from each other in the digitizer is reduced, and thus, the foldable display device includes the digitizer with improved sensing reliability.

According to the above, a stress generated during a folding operation is reduced in the digitizer, and thus, the foldable display device includes the digitizer with improved folding characteristics.

BRIEF DESCRIPTION OF THE DRAWINGS

The above and other advantages of the present disclosure will become readily apparent by reference to the following detailed description when considered in conjunction with the accompanying drawings wherein:

FIG. 5C is a plan view of a display device according to an embodiment of the present disclosure;

FIG. 8A is a plan view of a digitizer according to an embodiment of the present disclosure;

DETAILED DESCRIPTION OF EMBODIMENTS

Figure 1A:
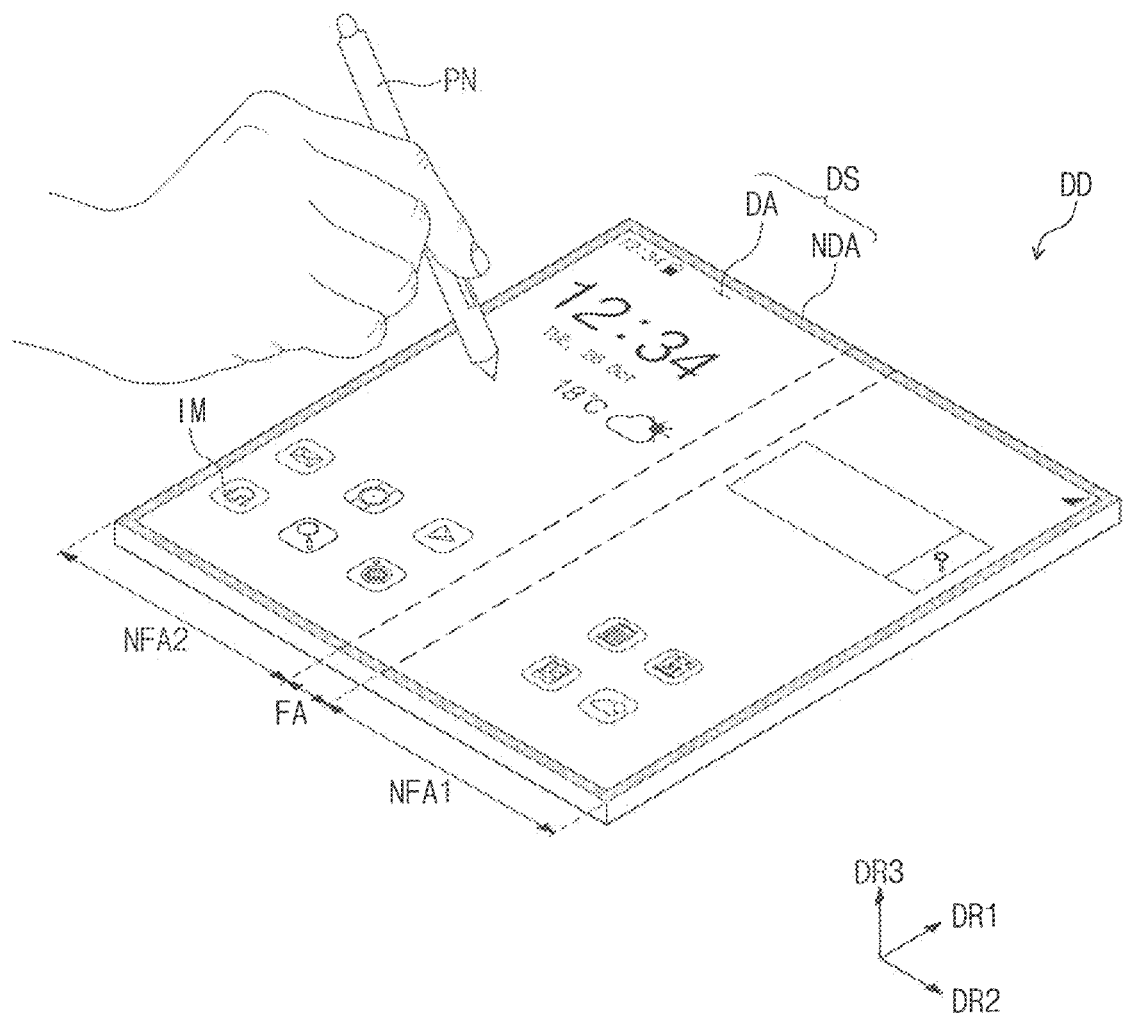
FIG. 1A is a perspective view of a foldable display device according to an embodiment of the present disclosure.

It will be understood that when an element (or area, layer, or portion) is referred to as being "on", "connected to" or "coupled to" another element or layer, it can be directly on, connected or coupled to the other element or layer or intervening elements or layers may be present. It will also be understood that when a component is referred to as being "between" two components or elements, it can be the only component between the two components, or one or more intervening components may also be present. It will also be understood that when a component is referred to as "covering" another component, it can be the only component covering the other component or element, or one or more intervening components may also be covering the other component. Other words use to describe the relationship between elements should be interpreted in a like fashion "" "" It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "may include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Herein, when one value is described as being about equal to another value or being substantially the same as or equal to another value, it is to be understood that the values are equal to each other to within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art.

The following exemplary embodiments of the inventive concept are provided to those skilled in the art in order to describe the inventive concept more completely. Accordingly, shapes and sizes of elements shown in the drawings may be exaggerated for clarity.

Hereinafter, the inventive concept will be explained in detail with reference to the accompanying drawings.

Figure 1B:
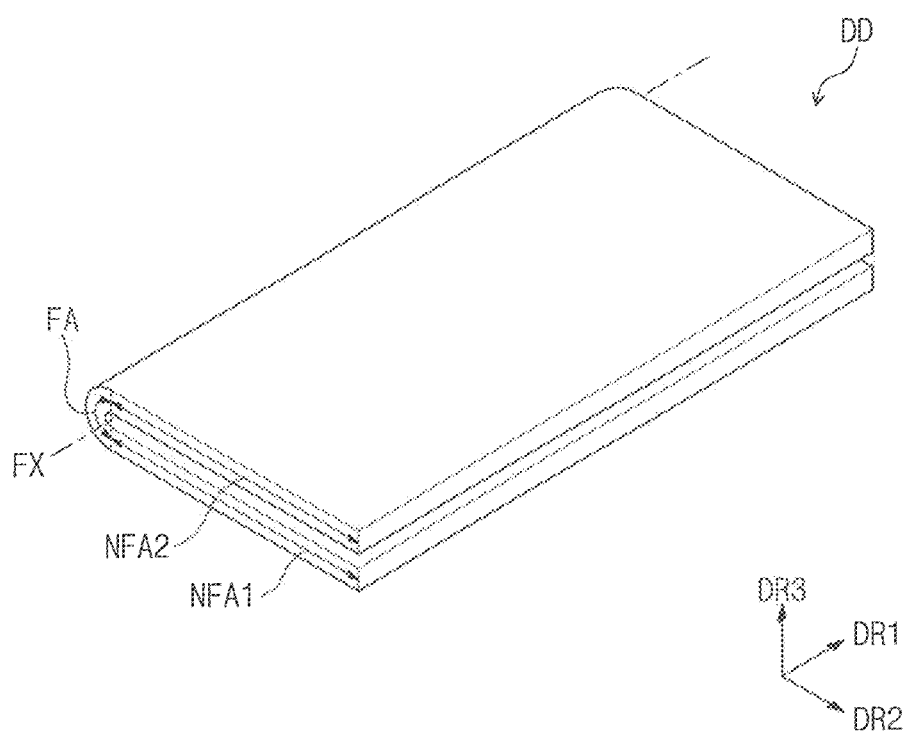
FIG. 1B is a perspective view of a foldable display device according to an embodiment of the present disclosure.

FIGS. 1A and 1B schematically illustrate perspective views of a foldable display device DD according to an embodiment. FIG. 1A shows the foldable display device DD in an unfolded state, and FIG. 1B shows the foldable display device in a folded state.

In the following description, a first direction DR1 may be a direction parallel to long sides of the foldable display device DD, and a second direction DR2 may be a direction parallel to short sides of the foldable display device DD. Further, a third direction DR3 may be a direction vertical the first direction DR1 and/or the second direction DR2. The first direction MI and the second direction DR2 may be commonly referred to as a horizontal direction. Further, the third direction DR3 may be referred to as a vertical direction, as indicated by the first, second and third directional axes shown in the figures.

According to an embodiment, a display surface DS may include a display area DA and a non-display area NDA around the display area DA. The display area DA may display the image IM. The non-display area NDA may surround the display area DA, however, it should not be limited thereto. The shape of the display area DA and the shape of the non-display area NDA may be different from what is shown in FIGS. 1A and 1B.

In the following description, the expressions "when viewed in a plane" and "on a plane" refer to a state of being viewed in the third direction DR3, as defined above.

The foldable display device DD may sense an external input applied thereto from an outside source. The external input may be a user input. The user input may include various forms, such as, for example, a part of user's body (e.g., finger, hand), light, heat, or pressure. The foldable display device DD may also sense an external input generated by an electromagnetic pen PN.

FIG. 1A shows the foldable display device DD in the unfolded state, referred to herein as a first mode. In FIG. 1A, the external input is generated by an electromagnetic pen PN as shown. Although not shown in figures, the electromagnetic pen PN may be detachable from the foldable display device DD. The foldable display device DD may provide and/or receive signals corresponding to the attachment and detachment of the electromagnetic pen PN.

The foldable display device DD may include a folding area FA, a first non-folding area NFA1, and a second non-folding area NFA2. The folding area FA may be disposed between the first non-folding area NFA1 and the second non-folding area NFA2 in the second direction DR2.

As shown in FIG. 1B, the folding area FA may be folded with respect to a folding axis FX substantially parallel to the first direction DR1. The folding area FA may have a predetermined curvature. The foldable display device DD may be inwardly folded, referred to herein as inner-folding, such that the first non-folding area NFA1 may face the second non-folding area NFA2 such that the display surface DS is not exposed to the outside.

According to an embodiment, the foldable display device DD may be outwardly folded, referred to herein as outer-folding, such that the display surface DS is exposed to the outside. According to an embodiment, the foldable display device DD may be provided such that the inner-folding operation and the outer folding operation are repeatable from an unfolding operation.

According to an embodiment, the foldable display device DD is provided such that the inner-folding operation and outer-folding operation are repeatable and performable in any order.

Figure 2:
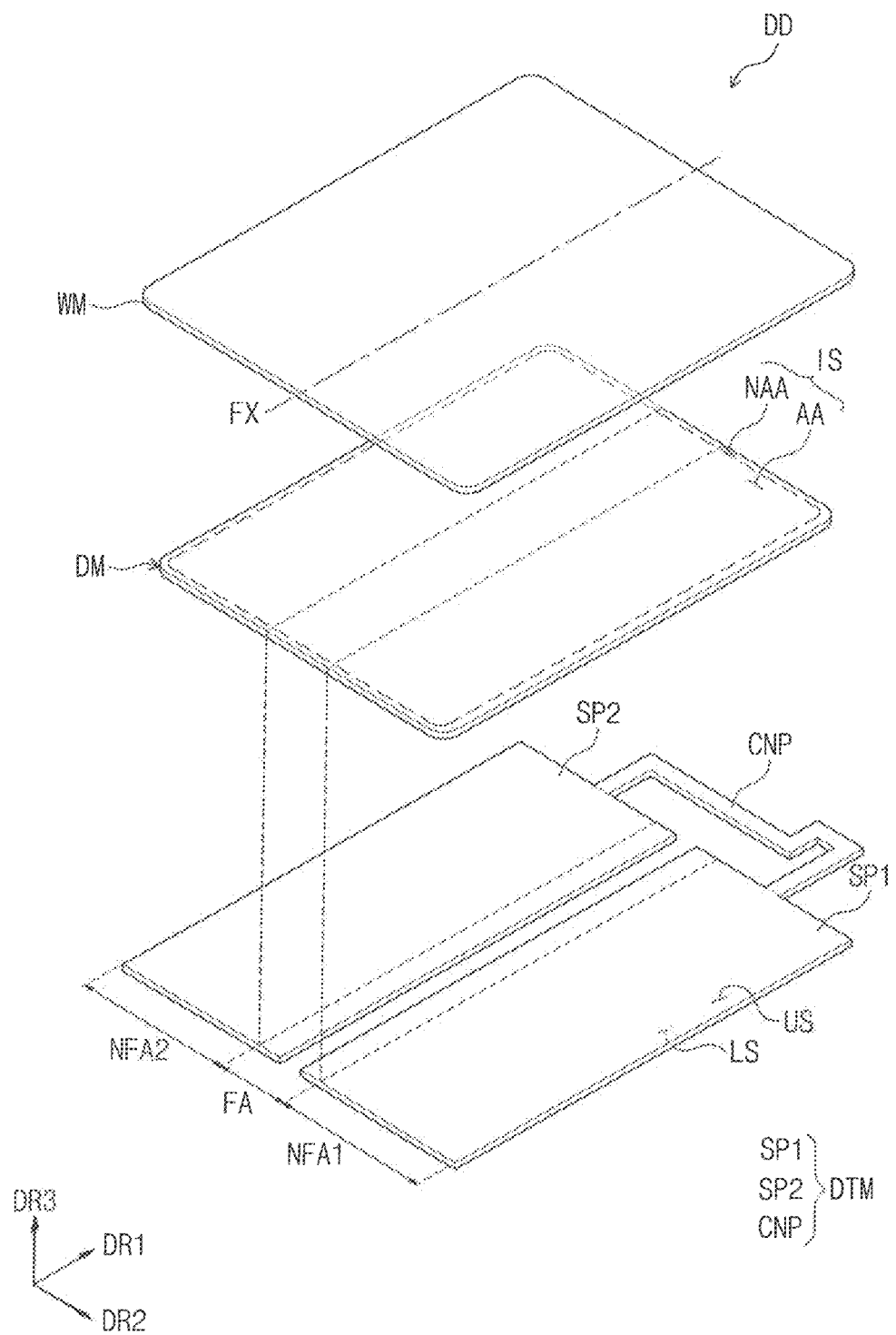
FIG. 2 is an exploded perspective view of a foldable display device according to an embodiment of the present disclosure.
Figure 3:
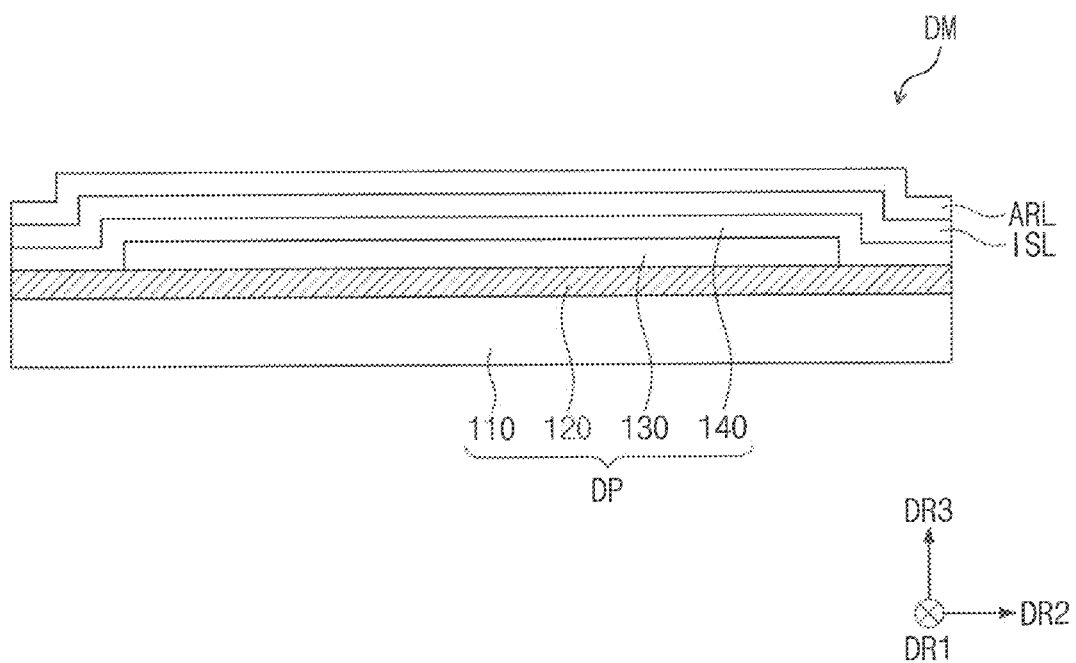
FIG. 3 is a cross-sectional view of a display module according to an embodiment of the present disclosure.

FIG. 2 is an exploded perspective view of the display device DD according to an embodiment of the inventive concept. FIG. 3 is a cross-sectional view of a display module DM according to an embodiment of the inventive concept.

Referring to FIG. 2, the foldable display device DD may include a window WM, a display module DM, and a digitizer DTM.

The window WM may be disposed on the display module DM. The window WM may provide an area that corresponds to the display area DA (See FIG. 1A) and is optically transparent. The window WM may provide a front surface of the foldable display device DD. The window WM will be described in greater detail below.

The display module DM may generate an image and may sense an external input. The display module DM may include a front surface IS including an active area AA and a peripheral area NAA. The active area AA may be activated in response to electrical inputs.

In the present embodiment, the active area AA of the display module DM may be an area in which both the image IM is displayed (See FIG. 1A) and the external input is sensed. According to an alternate embodiment, the active area AA of the display module DM may include an area in which the image IM is displayed and an area in which the external input is sensed, where the image display area is different than the area in which the external input is sensed.

The peripheral area NAA may be defined adjacent to the active area AA. The peripheral area NAA may surround the active area AA. A driving circuit or a driving line may be disposed in the peripheral area NAA to drive the active area AA.

Referring to FIG. 3, the display module DM may include a display panel DP, an input sensor ISL, and an anti-reflective layer ARL. The display panel DP may include a base layer 110, a circuit layer 120, a light emitting element layer 130, and an encapsulation layer 140.

The base layer 110 may provide a base surface on which the circuit layer 120 is disposed. The base layer 110 may be a flexible substrate that is bendable, foldable, or rollable. The base layer 110 may be a glass substrate, a metal substrate, or a polymer substrate, however, it should not be limited thereto. According to an embodiment, the base layer 110 may be an inorganic layer, an organic layer, or a composite material layer.

The base layer 110 may have a multi-layer structure. For example, the base layer 110 may include a first synthetic resin layer, an inorganic layer having a single-layer or multi-layer structure, and a second synthetic resin layer disposed on the inorganic layer having a single-layer or multi-layer structure. Each of the first and second synthetic resin layers may include a polyimide-based resin, however, it should not be particularly limited.

The circuit layer 120 may be disposed on the base layer 110. The circuit layer 120 may include an insulating layer, a semiconductor pattern, a conductive pattern, and a signal line.

The light emitting element layer 130 may be disposed on the circuit layer 120. The light emitting element layer 130 may include a light emitting element. For example, the light emitting element may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from moisture, oxygen, and foreign substances such as dust particles. The encapsulation layer 140 may include at least one inorganic layer. The encapsulation layer 140 may include a stack structure in which an inorganic layer, an organic layer, and an inorganic layer are sequentially stacked.

The input sensor ISL may be disposed directly on the display panel DP. The input sensor ISL may be formed simultaneously with the display panel DP through successive processes. In the present disclosure, the expression "disposed directly on" is defined herein as no intervening elements are present between the input sensor ISL and the display panel DP. For example, a separate adhesive member may not be disposed between the input sensor ISL and the display panel DP.

The anti-reflective layer ARL may be disposed directly on the input sensor ISL. The anti-reflective layer ARL may reduce a reflectance with respect to an external light incident to the foldable display device DD. The anti-reflective layer ARL may include color filters. The color filters may be arranged in a predetermined arrangement. As an example, the color filters may be arranged by taking into account colors of lights emitted from pixels included in the display panel DP. In addition, the anti-reflective layer ARL may further include a black matrix adjacent to the color filters.

According to an embodiment, the respective positions of the input sensor ISL and the anti-reflective layer ARL may be interchanged. According to an embodiment, the anti-reflective layer ARL may be replaced with a polarizing film. The polarizing film may be coupled with the input sensor ISL using an adhesive layer.

Referring again to FIG. 2, the digitizer DTM may be disposed under the display module DM. The digitizer DTM may include an upper surface US facing the display module DM and a lower surface LS opposite the upper surface US.

The digitizer DTM is sometimes referred to herein as an EMR sensing panel and may include a plurality of loop coils for generating a magnetic field with the electromagnetic pen PN at a predetermined resonant frequency. The magnetic field generated by the loop coils may be applied to an LC resonant circuit formed by an inductor (coil) and a capacitor of the electromagnetic pen PN. The single inductor of the LC circuit of the electromagnetic pen PN may generate a current in response to the magnetic field applied by the loop coils of the EMR sensing panel and may supply the generated current to the capacitor.

Accordingly, the capacitor may be charged with the current supplied from the inductor and may discharge the charged current to the inductor. Consequently, an induced magnetic field at the resonant frequency may be emitted by the inductor of the electromagnetic pen PN which may be absorbed by the loop coils of the digitizer. Thus, the position in the touch screen being approached by the electromagnetic pen PN may be determined.

The digitizer DTM may include a first sensing portion SP1, a second sensing portion SP2, and a connection portion CNP. The first sensing portion SP1 and the second sensing portion SP2 may be spaced apart from each other in the folding area FA along the second direction DR2. Accordingly, when the display module DM is folded, the display module DM may be folded without interference from the digitizer DTM, and cracks may be prevented from being generated in the loop coils included in the digitizer DTM in the folding area FA.

As stated above, the first sensing portion SP1 and the second sensing portion SP2 spaced apart from each other in the folding area FA may be connected to each other by the connection portion CNP. Thus, the first sensing portion SP1 and the second sensing portion SP2 may be driven by one connector CNT (See FIG. 5A) disposed in one of the first sensing portion SP1 and the second sensing portion SP2.

The first sensing portion SP1 may overlap the first non-folding area NFA1 and a portion of the folding area FA adjacent to the first non-folding area NFA1. Similarly, the second sensing portion SP2 may overlap the second non-folding area NFA2 and another portion of the folding area FA adjacent to the second non-folding area NFA2. The first and second sensing portions SP1 and SP2 may be spaced apart from each other in the folding area FA.

The connection portion CNP may connect the first sensing portion SP1 to the second sensing portion SP2. FIG. 2 shows an exemplary configuration in which the connection portion CNP is connected to the respective short sides of the first sensing portion SP1 and the second sensing portion SP2 at an upper end in the first direction DR1. Alternatively, according to an embodiment, the connection portion CNP may be connected at the lower ends of each of the first sensing portion SP1 and the second sensing portion SP2. According to an embodiment, the first sensing portion SP1, the second sensing portion SP2, and the connection portion CNP may be integrally connected to each other. A detailed description thereof will be given later.

Figure 4:
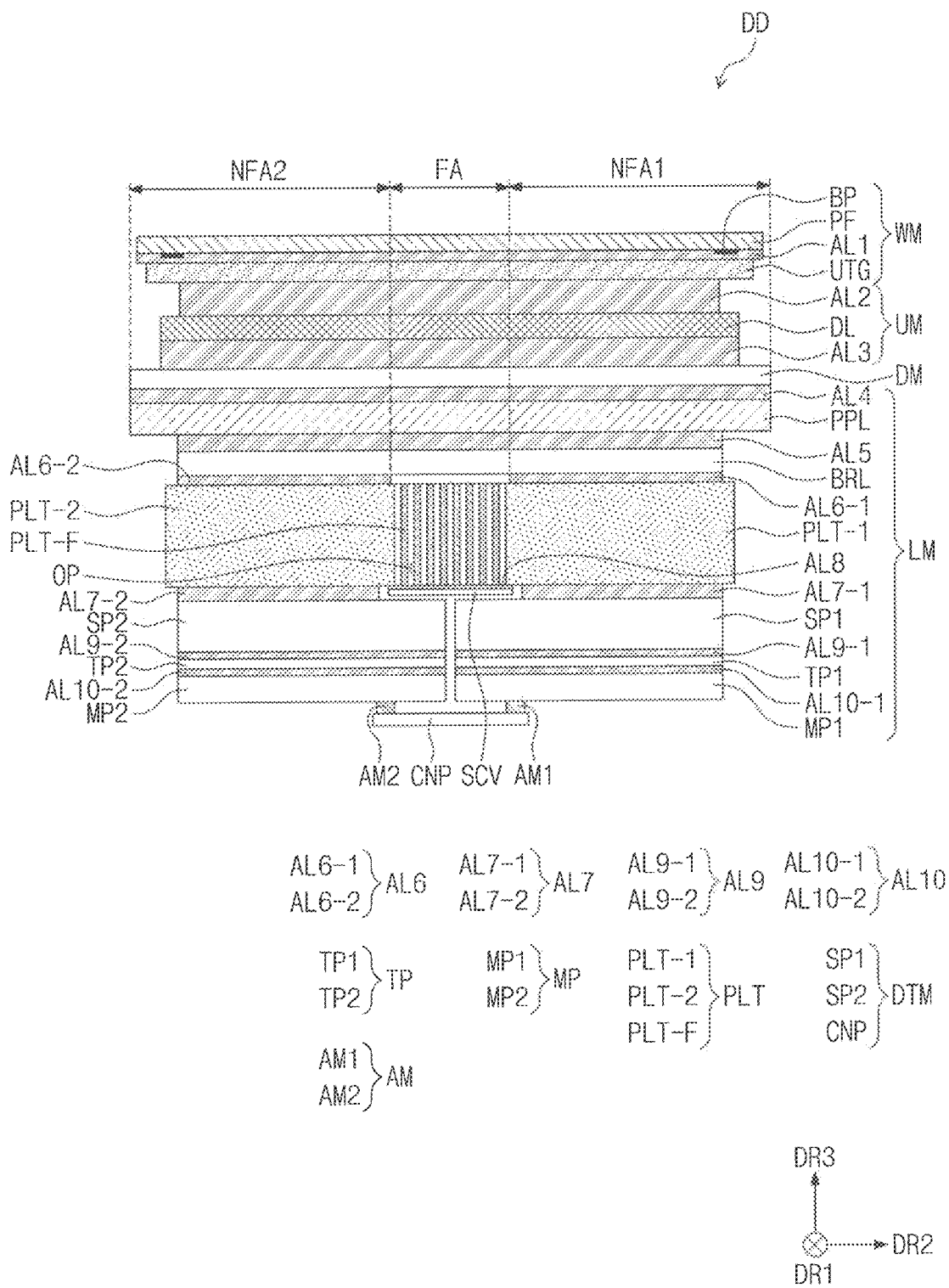
FIG. 4 is a cross-sectional view of a foldable display device according to an embodiment of the present disclosure.

FIG. 4 is a cross-sectional view of the foldable display device DD illustrating the stack structure of the display device DD in cross-section as well as various components of the display device DD, according to an embodiment.

Referring to FIG. 4, the foldable display device DD may include the window WM, an upper member UM, the display module DM, and a lower member LM. The upper member UM may collectively refer to various components disposed between the window WM and the display module DM. The lower member LM may collectively refer to various components disposed under the display module DM. For example, the digitizer DTM may be one of the components that may be included in the lower member LM.

The window WM may include a thin glass substrate UTG, a window protective layer PF disposed on the thin glass substrate UTG, and a bezel pattern BP disposed on a lower surface of the window protective layer PF. The window WM may include a first adhesive layer AL1 that attaches the window protective layer PF to the thin glass substrate UTG.

The bezel pattern BP may overlap the non-display area NDA shown in FIG. 1A. The bezel pattern BP may be disposed on one surface of the thin glass substrate UTG or one surface of the window protective layer PF. FIG. 4 shows a structure in which the bezel pattern BP is disposed on the lower surface of the window protective layer PF, however, it should not be limited thereto. According to an embodiment, the bezel pattern BP may be disposed on an lower surface of the window protective layer PF. The bezel pattern BP may be a colored light blocking layer and may be formed by a coating process. The bezel pattern BP may include a base material and a pigment or a dye mixed with the base material.

The thin glass substrate UTG may have a thickness in a range from about 15 μm to about 45 μm. The thin glass substrate UTG may be a chemically strengthened glass. The occurrence of crease in thin glass substrate UTG may be minimized even though the folding and unfolding operations are repeatedly performed.

The window protective layer PF may have a thickness in a range from about 50 μm to about 80 μm. A synthetic resin film of the window protective layer PF may include polyimide, polycarbonate, polyamide, triacetylcellulose, polymethylmethacrylate, or polyethylene terephthalate. Although not shown, at least one of a hard coating layer, an anti-fingerprint layer, and an anti-reflective layer may be disposed on the upper surface of the window protective layer PF.

The first adhesive layer AL1 may be a pressure sensitive adhesive (PSA) film or an optically clear adhesive (OCA). Adhesive layers described hereinafter may include the same adhesive as the first adhesive layer AL1.

The first adhesive layer AL1 may be separated from the thin glass substrate UTG. Since a strength of the window protective layer PF is less than that of the thin glass substrate UTG, scratches may occur relatively easily on the window protective layer PF. After the first adhesive layer AL1 and the window protective layer PF are separated from each other, another window protective layer PF may be attached to the thin glass substrate UTG.

When viewed in a plane (i.e., the third direction), an edge of the thin glass substrate UTG may not overlap the bezel pattern BP. When the above conditions are satisfied, the edge of the thin glass substrate UTG may be exposed without being covered by the bezel pattern BP, and fine cracks generated on the edge of the thin glass substrate UTG may be inspected using an inspection device.

The upper member UM may include an upper film DL. The upper film DL may include a synthetic resin film. The synthetic resin film may include polyimide, polycarbonate, polyamide, triacetylcellulose, polymethylmethacrylate, or polyethylene terephthalate.

The upper film DL may absorb an external impact applied to the front surface of the foldable display device DD. The display module DM, described above with reference to FIG. 3, may include the anti-reflective layer ARL, which may be employed in lieu of the polarizing film, thus enhancing the impact resistance from externally impacts applied to the front surface of the foldable display device DD. The upper film DL may provide additional impact resistance to external impacts by including the anti-reflective layer ARL to the foldable display device DD, however, the upper film DL is optional.

The upper member UM may include a second adhesive layer AL2 that attaches the upper film DL to the window WM and a third adhesive layer AL3 that attaches the upper film DL to the display module DM.

The lower member LM may include a panel protective layer PPL, a barrier layer BRL, a support layer PLT, a cover layer SCV, the digitizer DTM, an insulating layer TP, a lower support plate MP, and fourth, fifth, sixth, seventh, eighth, ninth, and tenth adhesive layers AL4, AL5, AL6, AL7, ALB, AL9, and AL10. The fourth to tenth adhesive layers AL4 to AL10 may include an adhesive such as a pressure sensitive adhesive or an optically clear adhesive. According to an embodiment, some of the above-mentioned components may be omitted.

The panel protective layer PPL may be disposed under the display module DM. The panel protective layer PPL may protect a lower portion of the display module DM. The panel protective layer PPL may include a flexible synthetic resin film. For example, the panel protective layer PPL may include polyethylene terephthalate.

As shown in FIG. 4, the fifth adhesive layer AL5 may attach the panel protective layer PPL to the barrier layer BRL. The barrier layer BRL may be disposed under the panel protective layer PPL. The barrier layer BRL may increase the resistance against a compressive force caused by an external pressure force. Accordingly, the barrier layer BRL may prevent the display panel DP from being deformed. The barrier layer BRL may include a flexible plastic material, such as polyimide or polyethylene terephthalate. In addition, the barrier layer BRL may be a colored film with low light transmittance. The barrier layer BRL may absorb a light incident thereto from the outside. As an example, the barrier layer BRL may be a black synthetic resin film. When looking at the foldable display device DD from an upper side of the window protective layer PF, components disposed under the barrier layer BRL may not be viewed by the user.

The sixth adhesive layer AL6 may attach the barrier layer BRL to the support layer PLT. The sixth adhesive layer AL6 may include a first portion AL6-1 and a second portion AL6-2 separated from the first portion AL6-1.

The support layer PLT may be disposed under the barrier layer BRL. The support layer PLT may support components disposed on the support layer PLT and may maintain the unfolded state or the folded state of the foldable display device DD. The support layer PLT may have a higher strength than that of the barrier layer BRL.

The support layer PLT may include at least a first support portion PLT-1 corresponding to the first non-folding area NFA1 and a second support portion PLT-2 corresponding to the second non-folding area NFA2. The first support portion PLT-1 and the second support portion PLT-2 may be spaced apart from each other in the second direction DR2.

The support layer PLT may include a folding portion PLT-F corresponding to the folding area FA, disposed between the first support portion PLT-1 and the second support portion PLT-2, and provided with a plurality of openings OP defined therethrough. The openings OP may be arranged to allow the folding portion PLT-F to have a lattice shape when viewed in a plane. The first support portion PLT-1, the second support portion PLT-2, and the folding portion PLT-F may be provided integrally with each other.

The folding portion PLT-F may prevent a foreign substance from entering a center area of the barrier layer BRL, which is not covered by the first support portion PLT-1 and the second support portion PLT-2, during the folding operation of the foldable display device DD shown in FIG. 1B. Due to the openings OP, the flexibility of the folding portion PLT-F may be improved. In addition, since the sixth adhesive layer AL6 is not disposed in the folding portion PLT-F, the flexibility of the support layer PLT may be improved. According to an embodiment, the folding portion PLT-F may be omitted. In this case, the support layer PLT may include the first support portion PLT-1 and the second support portion PLT-2 spaced apart from the first support portion PLT-1.

The support layer PLT may be selected from materials that transmit an electromagnetic field generated by the digitizer DTM without loss or with minimal loss. The support layer PLT may include a non-metallic material. The support layer PLT may include a reinforced fiber composite material. As an example, the support layer PLT may include a matrix portion and a reinforced fiber disposed in the matrix portion. The matrix portion may include a thermoplastic resin. The matrix portion may include a polymer resin. As an example, the matrix portion may include a polyamide-based resin or a polypropylene-based resin. The reinforced fiber may be a carbon fiber or a glass fiber. For example, the reinforced fiber composite material may be a carbon fiber reinforced plastic (CFRP) or a glass fiber reinforced plastic (GFRP). However, materials for the support layer PLT should not be limited thereto.

The cover layer SCV and the digitizer DTM may be disposed under the support layer PLT. The cover layer SCV may be disposed to overlap the folding area FA. The digitizer DTM may include the first sensing portion SP1 and the second sensing portion SP2, which respectively overlap the first support portion PLT-1 and the second support portion PLT-2. A portion of the first sensing portion SP1 and a portion of the second sensing portion SP2 may be disposed under the cover layer SCV.

The seventh adhesive layer AL7 may attach the support layer PLT to the digitizer DTM, and the eighth adhesive layer AL8 may attach the cover layer SCV to the support layer PLT. The seventh adhesive layer AL7 may include a first portion AL7-1 attaching the first support portion PLT-1 to the first sensing portion SP1 and a second portion AL7-2 attaching the second support portion PLT-2 to the second sensing portion SP2.

The cover layer SCV may be disposed between the first portion AL7-1 and the second portion AL7-2 in the second direction DR2. The cover layer SCV may be spaced apart from the digitizer DTM to prevent interference with the digitizer DTM in the unfolded state. A sum of a thickness of the cover layer SCV and a thickness of the eighth adhesive layer AL8 may be smaller than a thickness of the seventh adhesive layer AL7.

The cover layer SCV may cover the openings OP of the folding portion PLT-F. The cover layer SCV may have an elastic modulus less than that of the support layer PLT. As an example, the cover layer SCV may include thermoplastic polyurethane, rubber, or silicone, however, it should not be limited thereto.

The first sensing portion SP1 of the digitizer DTM may be disposed under the first support portion PLT-1. A portion of the first sensing portion SP1 may overlap a portion of the folding portion PLT-F. The second sensing portion SP2 of the digitizer DTM may be disposed under the second support portion PLT-2. A portion of the second sensing portion SP2 may overlap a portion of the folding portion PLT-F.

The insulating layer TP may be disposed under the digitizer DTM. The insulating layer TP may prevent static electricity from entering the digitizer DTM. The insulating layer TP may be an insulating film. The insulating layer TP may include a first insulating portion TP1 and a second insulating portion TP2, and the first insulating portion TP1 and the second insulating portion TP2 may be respectively coupled to a lower portion of the first sensing portion SP1 and a lower portion of the second sensing portion SP2.

The ninth adhesive layer AL9 may attach the digitizer DTM to the insulating layer TP. The ninth adhesive layer AL9 may include a first portion AL9-1 and a second portion AL9-2, which respectively correspond to the first insulating portion TP1 and the second insulating portion TP2.

The lower support plate MP may be disposed under the insulating layer TP. The lower support plate MP may include a first support plate MP1 and a second support plate MP2, which respectively overlap the first insulating portion TP1 and the second insulating portion TP2. The lower support plate MP may absorb the external impact applied thereto from a lower side thereof. The lower support plate MP may include a metal material such as stainless steel.

The tenth adhesive layer AL10 may attach the insulating layer TP to the lower support plate MP. The tenth adhesive layer AL10 may include a first portion AL10-1 and a second portion AL10-2, which respectively correspond to the first support plate MP1 and the second support plate MP2.

According to the present embodiment, a portion of the connection portion CNP of the digitizer DTM may be disposed under the lower support plate MP. The connection portion CNP may extend from the first and second sensing portions SP1 and SP2 and may be bent to be disposed under the lower support plate MP.

A portion of the connection portion CNP may be coupled to the lower support plate MP by a lower adhesive layer AM. The lower adhesive layer AM may include a first adhesive member AM1 disposed between the connection portion CNP and the first support plate MP1 and a second adhesive member AM2 disposed between the connection portion CNP and the second support plate MP2.

Figure 5A:
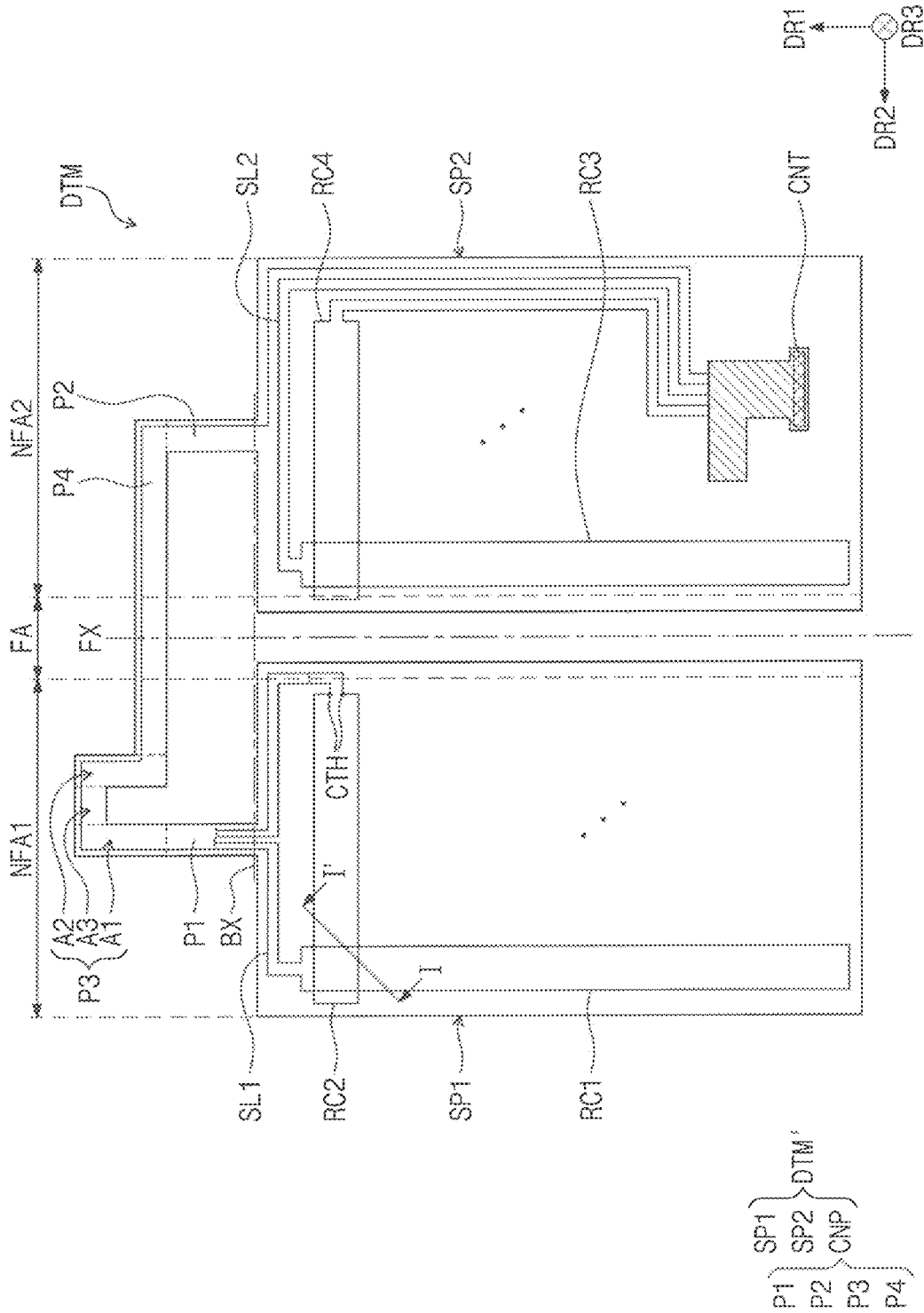
FIG. 5A is a plan view of a digitizer according to an embodiment of the present disclosure.
Figure 5B:
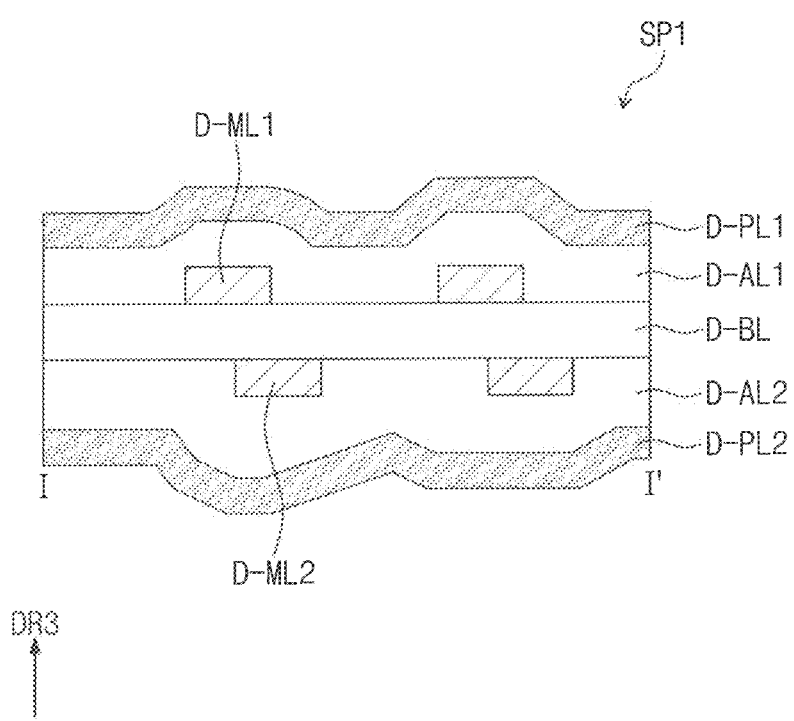
FIG. 5B is a cross-sectional view taken along a line I-I' of FIG. 5A.
Figure 5D:
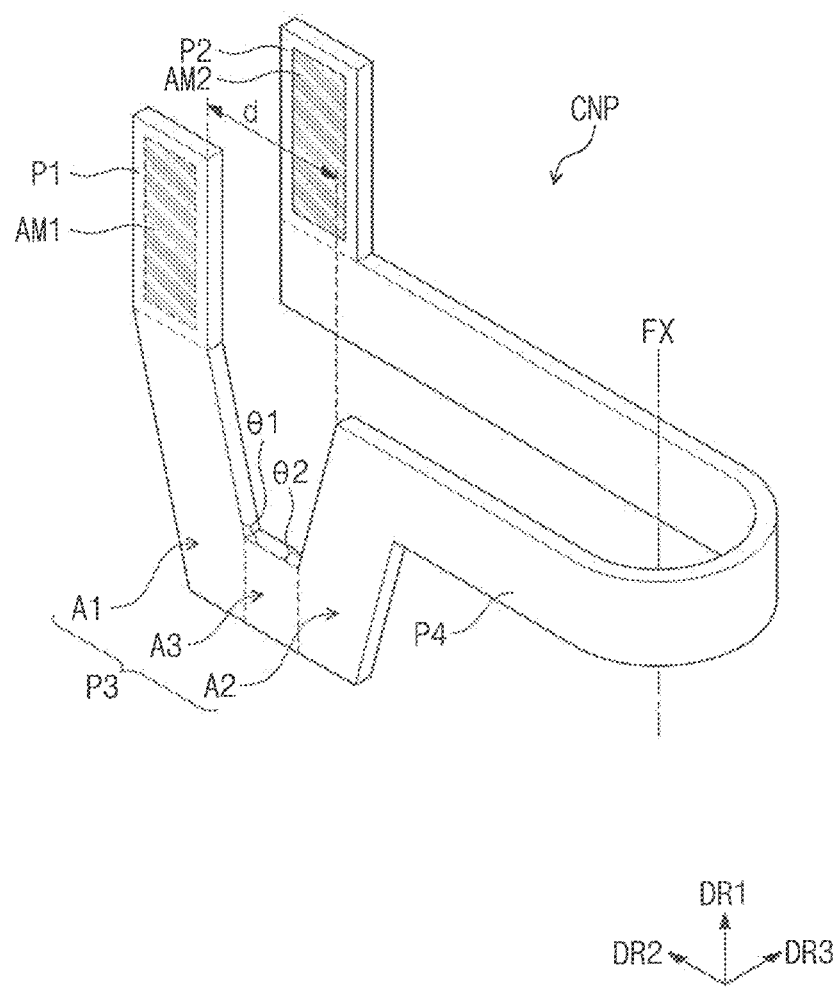
FIG. 5D is an enlarged perspective view of a folded state of a portion of a digitizer according to an embodiment of the present disclosure.

FIG. 5A is a plan view of the digitizer DTM according to an embodiment of the present disclosure. FIG. 5B is a cross-sectional view taken along a line I-I' of FIG. 5A. FIG. 5C is a plan view of the display device DD according to an embodiment of the present disclosure. FIG. 5D is an enlarged perspective view of a folded state of a portion of the digitizer according to an embodiment of the present disclosure.

Referring now to FIGS. 5A and 5C, where FIG. 5A is a plan view of the lower surface LS (See FIG. 2) of the digitizer DTM And FIG. 5C is a plan view of a lower surface of the foldable display device DD after the connection portion CNP of the digitizer DTM is bent. In FIGS. 5A and 5C, for ease of explanation, the first non-folding area NFA1, the second non-folding area NFA2, and the folding area FA are shown to be described as follows.

With reference to FIG. 5A, the digitizer DTM may include the first sensing portion SP1 overlapping both the first non-folding area NFA1 and a portion of the folding area FA adjacent to the first non-folding area NFA1. FIG. 5A further shows the second sensing portion SP2 overlapping the second non-folding area NFA2, another portion of the folding area FA adjacent to the second non-folding area NFA2, as well as the connection portion CNP. The connection portion CNP may extend from a short side of the first sensing portion SP1, disposed at an upper end to a short side of the second sensing portion SP2, disposed at an upper end.

According to the present embodiment, the connection portion CNP may include a first portion P1, a second portion P2, a third portion P3, and a fourth portion P4. The connection portion CNP may have a band shape obtained by connecting the first portion P1, the second portion P2, the third portion P3, and the fourth portion P4. The first portion P1, the second portion P2, the third portion P3, and the fourth portion P4 may be provided as one component, however, for ease of explanation, the first, second, third, and fourth portions P1, P2, P3, and P4 will be described as separate parts. At least one of the first portion P1, the second portion P2, the third portion P3, and the fourth portion P4 included in the connection portion CNP may have a curved shape.

The first portion P1 may extend from one end of the first sensing portion SP1 in the first direction DR1. A portion of the first portion P1, which is adjacent to one end of the first sensing portion SP1, may be bent with respect to a bending axis BX extending in the second direction DR2.

The second portion P2 may extend from one end of the second sensing portion SP2 in the first direction DR1. A portion of the second portion P2, which is adjacent to one end of the second sensing portion SP2, may be bent with respect to the bending axis BX extending in the second direction DR2.

The bending axis BX may extend in a direction substantially perpendicular to the folding axis FX, i.e., the second direction DR2.

The third portion P3 may be disposed between the first portion P1 and the second portion P2. The connection portion CNP may include a single third portion P3. The third portion P3 may extend from the first portion P1 or the second portion P2. For example, FIG. 5A shows a structure in which the third portion P3 extends from the first portion P1.

According to the present embodiment, the third portion P3 may include a first area A1, a second area A2, and a third area A3. According to an embodiment, each of the first and second areas A1 and A2 may extend in the first direction DR1. That is, the first portion P1 and the first area A1 may extend in the same direction. In this case, the third area A3 may extend in the second direction DR2 that is substantially perpendicular to the first direction DR1. The first area A1 and the second area A2 may face each other. The third area A3 may be disposed between the first area A1 and the second area A2. The third area A3 may be disposed between one end of the first area A1 and one end of the second area A2, which faces one end of the first area A1.

According to the present embodiment, the first, second, and third areas A1, A2, and A3 of the third portion P3 may be defined adjacent to the first sensing portion SP1 at the left side of the folding axis FX.

The fourth portion P4 may extend in the second direction DR2 perpendicular to the first direction DR1 and may be disposed between the second portion P2 and the third portion P3. The fourth portion P4 may extend from the second portion P2 to the second area A2. The fourth portion P4 may cross the folding axis FX.

In an embodiment where the third portion P3 extends from the second portion P2, the first, second, and third areas A1, A2, and A3 of the third portion P3 may be defined adjacent to the second sensing portion SP2 at the right side of the folding axis FX. In this case, the second portion P2 and the second area A2 may extend in the same direction, and the third area A3 may extend in the second direction DR2. In addition, the fourth portion P4 may be disposed between the first portion P1 and the third portion P3 and may extend in the second direction DR2.

The digitizer DTM may include first and second sensing coils RC1 and RC2, third and fourth sensing coils RC3 and RC4, first signal lines SL1, and second signal lines SL2.

The first and second sensing coils RC1 and RC2 may be insulated from each other while crossing over each other in the first sensing portion SP1. Each of the first sensing coils RC1 may be oriented such that their respective long sides extend in the first direction DR1 with the short sides extending in the second direction DR2, and respectively disposed such that the long sides overlap at one end. One short side of the first sensing coils RC1 may be cut and connected to the first signal lines SL1. For example, in the present embodiment, the short side of the first sensing coils RC1 adjacent to the connection portion CNP is cut. According to an embodiment, as an example, the short side of the first sensing coils RC1 disposed further from the connection portion CNP may be cut and connected to the first signal lines SL1.

Each of the second sensing coils RC2 may be oriented such that their long sides extend in the second direction DR2 and short sides extending in the first direction DR1 and respectively disposed such that the long sides overlap at one end. One of the short sides of the second sensing coil RC2 may be cut and connected to the first signal lines SL1. In the present embodiment, as an example, the short side of the second sensing coils RC2 adjacent to the folding axis FX may be cut. According to an embodiment, the short side of the second sensing coils RC2 disposed further from the folding axis FX may be cut and connected to the first signal lines SL1.

The third and fourth sensing coils RC3 and RC4 may be insulated from each other while crossing over each other in the second sensing portion SP2. Each of the third sensing coils RC3 may include long sides extending in the first direction DR1 and short sides extending in the second direction DR2 and respectively disposed such that the long sides overlap at one end. One short side of the third sensing coils RC3 may be cut and connected to the second signal lines SL2. For example, in the present embodiment, the short side of the third sensing coils RC3 disposed adjacent to the connection portion CNP is cut. According to an embodiment, the short side of the third sensing coils RC3 disposed further from the connection portion CNP may be cut and connected to the second signal lines SL2.

Each of the fourth sensing coils RC4 may be oriented such that their long sides extend in the second direction DR2 and short sides extend in the first direction DR1 and respectively disposed such that the long sides overlap at one end. One short side of the fourth sensing coils RC4 may be cut and connected to the second signal lines SL2. In the present embodiment, for example, the short side adjacent to the folding axis FX is cut. According to an embodiment, the short side disposed further from the folding axis FX may be cut and connected to the second signal lines SL2.

Hereinafter, the stack structure of the digitizer DTM will be described with respect to the cross-section of the first sensing portion SP1 with reference to FIG. 5B. Since the first sensing portion SP1 and the second sensing portion SP2 have substantially the same structure, the cross-section of the first sensing portion SP1 shown in FIG. 5B may be applied to the stack structure of the second sensing portion SP2.

The first sensing portion SP1 may include the base layer D-BL, a first metal layer D-ML1 disposed on one surface of the base layer D-BL, and a second metal layer D-ML2 disposed on the other surface of the base layer D-BL. The base layer D-BL may include a synthetic resin film, e.g., a polyimide film. Each of the first and second metal layers D-ML1 and D-ML2 may include a metal material, such as gold (Au), silver (Ag), copper (Cu), or aluminum (Al). The first sensing coils RC1 (See FIG. 5A) may correspond to the first metal layer D-ML1, and the second sensing coils RC2 (See FIG. 5A) may correspond to the second metal layer D-ML2.

The cover layers D-PL1 and D-PL2 may be respectively disposed on different opposing surfaces of the base layer D-BL to protect the first metal layer D-ML1 and the second metal layer D-ML2. The first cover layer D-PL1 may be disposed on the first metal layer D-ML1 and may be attached to the one surface of the base layer D-BL by a first adhesive layer D-AL1. The second cover layer D-PL2 may be disposed on the second metal layer D-ML2 and may be attached to the other surface of the base layer D-BL by a second adhesive layer D-AL2. Each of the cover layers D-PL1 and D-PL2 may include the synthetic resin film, e.g., the polyimide film.

The connection portion CNP (See FIG. 5A) may be integrally connected to the first sensing portion SP1 and the second sensing portion SP2. In various embodiments, the connection portion CNP may extend from at least one of the base layer D-BL, the cover layers D-PL1 and D-PL2, and the conductive layers D-CL1 and D-CL2. As an example, the connection portion CNP may include a base layer extending from the first sensing portion SP1, the second sensing portion SP2, one conductive layer, and one cover layer.

Referring again to FIG. 5A, the digitizer DTM may be connected to one connector CNT. That is, the connector CNT may be disposed on one of the first sensing portion SP1 and the second sensing portion SP2. FIG. 5A shows a structure in which the connector CNT is disposed on the second sensing portion SP2 as a representative example. The first sensing portion SP1 and the second sensing portion SP2 of the digitizer DTM may be electrically connected to a main circuit board via one connector CNT.

One end of the first signal lines SL1 may be respectively connected to the first and second sensing coils RC1 and RC2, and the other end of the first signal lines SL1 may be connected to the connector CNT. According to the present embodiment, the first signal lines SL1 may extend from the first sensing portion SP1 to the connector CNT disposed on the second sensing portion SP2 via the connection portion CNP.

Accordingly, the first signal lines SL1 may electrically connect the first and second sensing coils RC1 and RC2 to the connector CNT via the connection portion CNP at one end and may electrically connect the first and second sensing coils RC1 and RC2 to the main circuit board at the other end.

According to an embodiment, the first signal lines SL1 may have a single-layer structure in the first sensing portion SP1 and the connection portion CNP. As an example, the first signal lines SL1 may include the first metal layer D-ML1 (See FIG. 5B) disposed on the surface of the base layer D-BL (See FIG. 5B). In this case, the second sensing coils RC2 disposed on the opposing surface of the base layer D-BL may be connected to the first signal lines SL1 via a contact hole CTH.

In the case where the first signal lines SL1 has a single-layer structure, the second cover layer D-PL2 and the second adhesive layer D-AL2 may be omitted, as shown in FIG. 5B. Accordingly, the connection portion CNP may have a thickness less than a thickness of either the first and second sensing portions SP1 and SP2. The connection portion CNP may be easily bent with respect to the bending axis BX and may be easily folded with respect to the folding axis FX.

According to an embodiment, the first signal lines SL1 may be disposed on plural layers, and thus, a width of the connection portion CNP when viewed in cross-section may be reduced.

The second signal lines SL2 may be disposed on the second sensing portion SP2. At one end, the second signal lines SL2 may be connected to the third and fourth sensing coils RC3 and RC4, respectively, and the other end of the second signal lines SL2 may be connected to the connector CNT. Accordingly, the second signal lines SL2 may electrically connect the third and fourth sensing coils RC3 and RC4 to the main circuit board.

According to an embodiment, the connection portion CNP may have a width in a range equal to or greater than about 10 micrometers and equal to or less than about 50 micrometers, as viewed in cross-section. When the width of the connection portion CNP in the plane is less than about 10 micrometers, the width of the connection portion CNP may be insufficient to place the first signal lines SL1. When the width of the connection portion CNP in the plane is greater than about 50 micrometers, folding characteristics of the connection portion CNP may be reduced.

As the digitizer DTM includes the connection portion CNP connecting the first and second sensing portions SP1 and SP2, provided with the first signal lines SL1 extending through the connection portion CNP, the digitizer DTM may be provided as an integral unit in which the first sensing portion SP1, the connection portion CNP, and the second sensing portion SP2 are sequentially arranged. Accordingly, the first signal lines SL1 and the second signal lines SL2 may be connected to one connector CNT and one main circuit board.

In a case where the first sensing portion SP1 and the second sensing portion SP2 of the digitizer DTM are not provided as an integral unit, but are instead provided as separate units without being connected, the first sensing portion SP1 and the second sensing portion SP2 may be connected to separate main circuit boards via separate connectors. Accordingly, in the case of utilizing separate and disconnected first and second sensing portions SP1 and SP2, there may be a difference in the sensing performance between the first and second sensing portions SP1 and SP2. In addition, a further drawback of using separate units is that a separate flexible circuit board is required to connect two main circuit boards to each other, and thus, defects, such as, a poor connection and a synchronization delay, may occur due to multiple connections among the two main circuit boards.

However, according to the inventive concept, given that the digitizer DTM is provided as the integral unit, the first and second sensing portions SP1 and SP2 may be controlled by a single connector CNT and a single circuit board connected to a single connector CNT. Accordingly, differences in the sensing performance between the first and second sensing portions SP1 and SP2 may be reduced as a result.

In addition, according to the inventive concept, since a separate flexible circuit board is not required to connect one or more additional multiple main circuit boards, a mounting efficiency of the digitizer DTM may increase, and defects, such as poor connection and synchronization delay caused by the need for multiple connections due to multiple circuit boards may be reduced.

Accordingly, the foldable display device DD according to the inventive concept may include a digitizer DTM that is manufactured through a simplified and economical process, obviating the need for multiple components, resulting in a display device DD with improved sensing reliability.

FIG. 5C is a plan view of the foldable display device DD with one end of the first portion P1 and one end of the second portion P2 of the connection portion CNP bent with respect to the bending axis BX. Notably, FIG. 5C shows the lower surface of the foldable display device DD.

One end of the first portion P1 may be bent with respect to the bending axis BX such that the first portion P1 may face the lower surface of the digitizer DTM. The first portion P1 may be bent in a direction toward the lower portion of the first sensing portion SP1, and thus, a portion of the first portion P1 may be disposed at a lower portion of the first support plate MP1 disposed under the first sensing portion SP1.

One end of the second portion P2 may be bent with respect to the bending axis BX such that the second portion P2 may face the lower surface of the digitizer DTM. The second portion P2 may be bent to a direction toward the lower portion of the second sensing portion SP2, and thus, a portion of the second portion P2 may be disposed at a lower portion of the second support plate MP2 disposed under the second sensing portion SP2.

With one end of the first portion P1 and one end of the second portion P2 bent, the third portion P3 and the fourth portion P4 may be disposed under the lower support plate MP. According to the inventive concept, the third portion P3 may be disposed on a lower surface of the first support plate MP1, and the fourth portion P4 may overlap the folding area FA and may be disposed on the lower surface of the first and second support plates MP1 and MP2.

According to an embodiment, at least a portion of the first portion P1, which overlaps the first support plate MP1 may be coupled with the lower surface of the first support plate MP1 by the first adhesive member AM1. At least a portion of the second portion P2, which overlaps the second support plate MP2, may be coupled with the lower surface of the second support plate MP2 by the second adhesive member AM2.

FIG. 5D is an enlarged view of the connection portion CNP of the digitizer DTM. More particularly, FIG. 5D is a perspective view of the connection portion CNP in the folded state of the foldable display device DD (See FIG. 1B).

As shown in FIG. 5D, when the display device DD (See FIG. 1B) is folded, the fourth portion P4 of the connection portion CNP may be folded with respect to the folding axis FX extending in the first direction DR1. Accordingly, the fourth portion P4 may include portions that face each other, and the first portion P1 may face the second portion P2.

According to the present embodiment shown in FIG. 5D, the first portion P1 may be fixed to the first support plate MP1 by the first adhesive member AM1. The second portion P2 may be fixed to the second support plate MP2 by the second adhesive member AM2.

The first portion P1 and the second portion P2 may be vulnerable to external impacts since they include the bent portion, however, the first portion P1 and the second portion P2 are fixed by the first adhesive member AM1 and the second adhesive member AM2, respectively, so that the shape of the first portion P1 and the shape of the second portion P2 are not deformed when the foldable display device DD is folded. Accordingly, the connection portion CNP and the first signal lines SL1 crossing the connection portion CNP may be prevented from being damaged.

According to the present embodiment, when the foldable display device DD is folded, a first internal angle $\theta 1$ between the first area A1 and the third area A3 of the third portion P3 and a second internal angle $\theta 2$ between the second area A2 and the third area A3 of the third portion P3 may increase. Therefore, a separation distance between the first area A1 and the second area A2 may increase as the distance from the third area A3 increases. That is, when the foldable display device DD is folded, the distance d between one end of the first area A1 adjacent to the first portion P1 and one end of the second area A2 adjacent to the fourth portion P4 may increase. Conversely, when the display device DD is unfolded, the distance d between one end of the first area A1 and one end of the second area A2 may decrease.

According to the inventive concept, when the display device DD is folded, the length of the connection portion CNP may vary in a direction perpendicular to the folding axis FX, and thus, a tensile stress generated in the connection portion CNP when the display device DD is folded may be reduced. Therefore, the first signal lines SL1 extending along the connection portion CNP may be prevented from being damaged.

According to the inventive concept, although the digitizer DTM includes the connection portion CNP overlapping the folding area FA to be integrally formed, any potential damage caused by the folding operation on the connection portion CNP may be reduced, and the reliability of the digitizer DTM may be improved.

In addition, as the first signal lines SL1 extends from the first sensing portion SP1 to the second sensing portion SP2 along the connection portion CNP, the first signal lines SL1 may be connected to the main circuit board without a separate bonding process, and thus, the dead space of the foldable display device DD may be reduced.

Figure 6A:
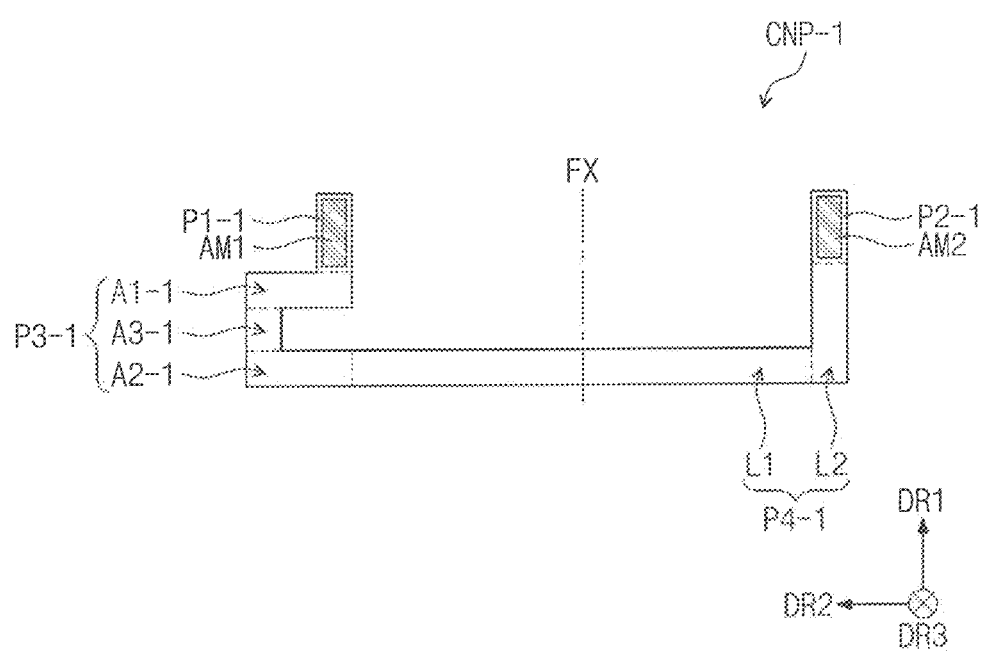
FIG. 6A is an enlarged plan view of a portion of a digitizer according to an embodiment of the present disclosure.
Figure 6B:
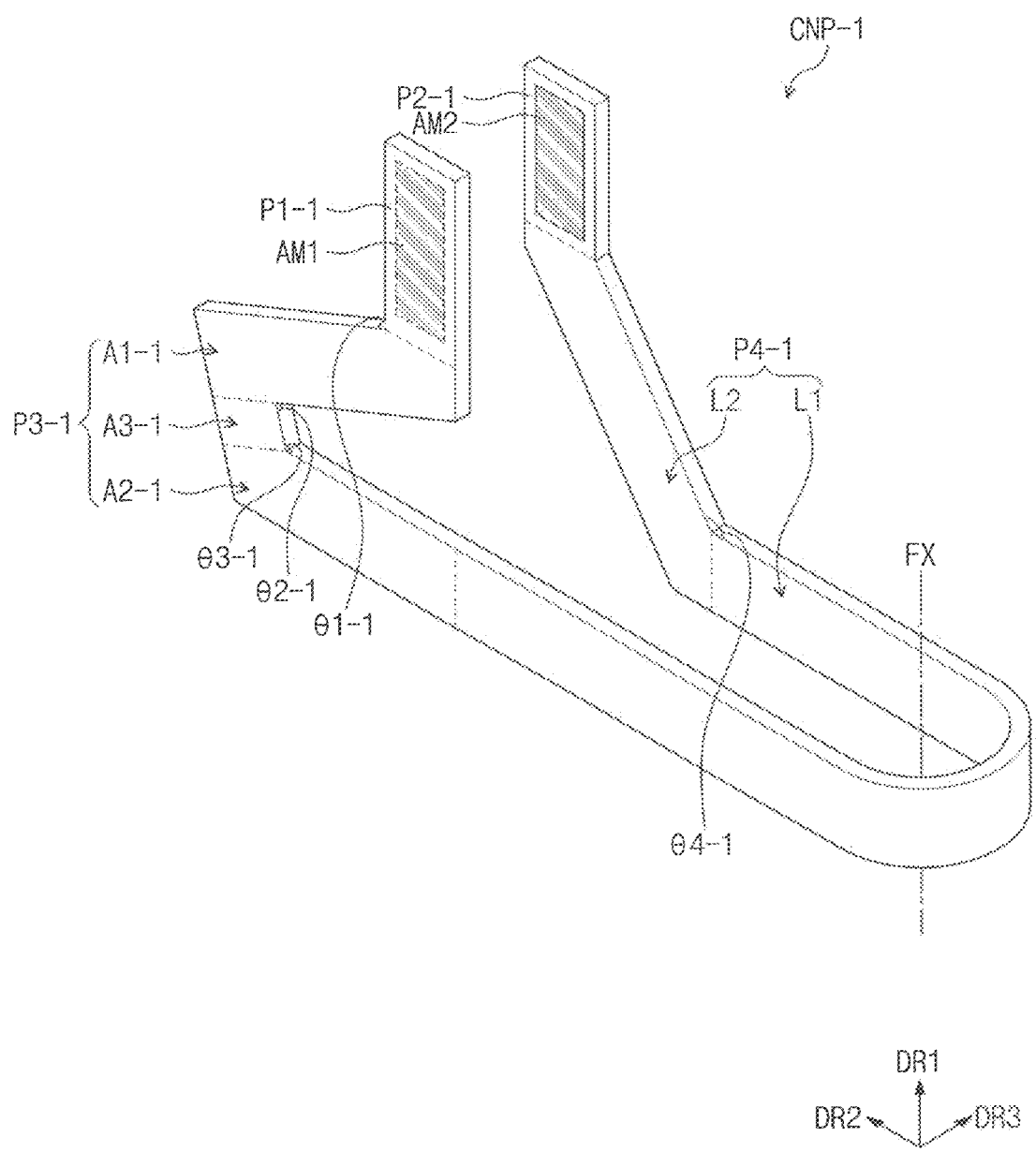
FIG. 6B is an enlarged perspective view of a folded state of a portion of a digitizer according to an embodiment of the present disclosure.
Figure 7A:
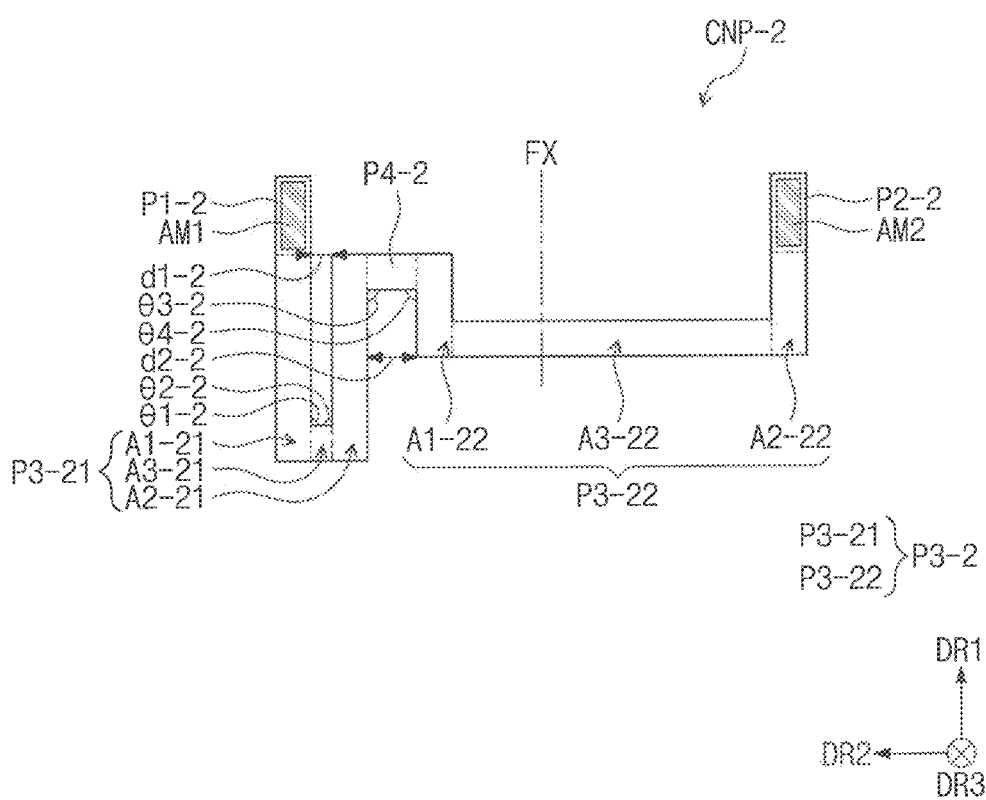
FIG. 7A is an enlarged plan view of a portion of a digitizer according to an embodiment of the present disclosure.
Figure 7B:
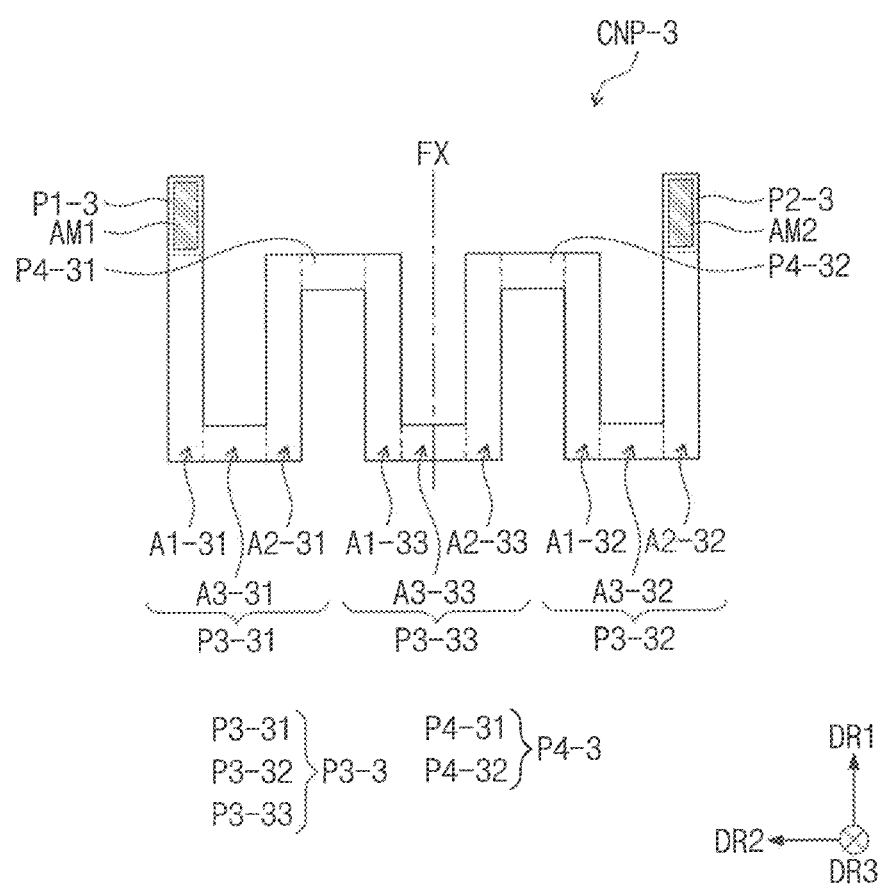
FIG. 7B is an enlarged plan view of a portion of a digitizer according to an embodiment of the present disclosure.

FIG. 6A is an enlarged plan view of a portion of a digitizer according to an embodiment of the present disclosure. FIG. 6B is an enlarged perspective view of a portion of a digitizer in a folded state according to an embodiment of the present disclosure. FIG. 7A is an enlarged plan view of a portion of a digitizer according to an embodiment of the present disclosure. FIG. 7B is an enlarged plan view of a portion of a digitizer according to an embodiment of the present disclosure.

Referring now to FIGS. 6A to 7B, the figures show connection portions CNP-1, CNP-2, and CNP-3 of a digitizer DTM (See FIG. 3). FIGS. 6A, 7A, and 7B are plan views of the connection portions CNP-1, CNP-2, and CNP-3 viewed from under the foldable display device DD (See FIG. 3). FIG. 6B is an enlarged perspective view of a portion of the digitizer in a folded state. Specifically, FIG. 6B shows the connection portion CNP-1 of FIG. 6A, which is folded with respect to the folding axis FX.

Referring to FIGS. 6A and 6B, the connection portion CNP-1 may include a first portion P1-1, a second portion P2-1, a third portion P3-1, and a fourth portion P4-1. According to the present embodiment, the connection portion CNP-1 may include only one third portion P3-1, which may be disposed either at the left side of the folding axis FX adjacent to the first sensing portion SP1 (See FIG. 5A) or at the right side of the folding axis FX adjacent to the second sensing portion SP2 (See FIG. 5A). Accordingly, the fourth portion P4-1 may be disposed to cross the folding axis FX.

According to the present embodiment, a first area A1-1 and a second area A2-1 of the third portion P3-1 may extend in the second direction DR2. The first area A1-1 may extend from the first portion P1-1 in a direction away from the folding axis FX along the second direction DR2. That is, according to the present embodiment, the first portion P1-1 and the first area A1-1 may extend in different directions from each other. In this case, a third area A3-1 may extend in the first direction DR1.

The fourth portion P4-1 may include a first extension portion L1 extending from the second area A2-1 to the second direction DR2 and crossing the folding axis FX and a second extension portion L2 extending from the second portion P2-1 to the first direction DR1.

As shown in FIG. 6B, the fourth portion P4-1 may be folded in the second direction DR2 with respect to the folding axis FX, and the first portion P1-1 and the second portion P2-1 may face each other.

According to the present embodiment, when the foldable display device DD (See FIG. 1B) is folded, a first internal angle $\theta 1$-1 between the first area A1-1 and the first portion P1-1, a second internal angle $\theta 2$-1 between the first area A1-1 and the third area A3-1, and a third internal angle $\theta 3$-1 between the second area A2-1 and the third area A3-1 may increase. Accordingly, the first area A1-1 and the third area A3-1 of the third portion P3-1 may be disposed in an oblique direction to be inclined with respect to the first direction DR1 and the second direction DR2, and the first area A1-1 and the second area A2-1 may be spaced apart from each other.

In addition, when the foldable display device DD is folded, an internal angle $\theta 4$-1 between the first extension portion L1 and the second extension portion L2 of the fourth portion P4-1 may increase, and the second extension portion L2 may be disposed in an oblique direction to be inclined with respect to the first and second directions DR1 and DR2.

Accordingly, as a length in a direction substantially perpendicular to the folding axis FX of the connection portion CNP-1 varies when the foldable display device DD is folded, a tensile stress generated in the connection portion CNP-1 may be reduced. Therefore, the first signal lines SL1 (See FIG. 5A) extending along the connection portion CNP-1 may be prevented from being damaged, and the reliability of the digitizer DTM (See FIG. 5A) may be improved.

Referring to FIG. 7A, the connection portion CNP-2 may include a first portion P1-2, a second portion P2-2, third portions P3-2, and a fourth portion P4-2. The connection portion CNP-2 may include two or more third portions P3-2.

According to the present embodiment, the connection portion CNP-2 may include two third portions P3-2 where each third portion P3-2 may include a third-first portion P3-21 and a third-second portion P3-22.

The third-first portion P3-21 may be disposed at a left side of the folding axis FX adjacent to the first sensing portion SP1 (See FIG. 5A). A first area A1-21 of the third-first portion P3-21 may extend from the first portion P1-2 in the same direction as the direction in which the first portion P1-2 extends, i.e., the first direction DR1. A second area A2-21 of the third-first portion P3-21 may face the first area A1-21 in the second direction DR2 and extend in the first direction DR1. In this case, a third area A3-21 of the third-first portion P3-21 may extend in the second direction DR2 perpendicular to the first direction DR1.

The third-second portion P3-22 may be disposed to cross the folding axis FX. A second area A2-22 of the third-second portion P3-22 may extend from the second portion P2-2 in the same direction as the second portion P2-2, i.e., the first direction DR1. A first area A1-22 of the third-second portion P3-22 may face the second area A2-22 in the second direction DR2 and extend in the first direction DR1. In this case, a third area A3-22 of the third-second portion P3-22 may extend in the second direction DR2 perpendicular to the first direction DR1.

A first area A1-22 of the third-second portion P3-22 may be disposed at the left side of the folding axis FX adjacent to the first sensing portion SP1 (See FIG. 5A), and the second area A2-22 may be disposed at a right side of the folding axis FX adjacent to the second sensing portion SP2 (See FIG. 5A). The third area A3-22 of the third-second portion P3-22 may cross the folding axis FX.

As shown in FIG. 7A, the first area A1-21 and a second area A2-21 of the third-first portion P3-21 may have a length different from that of the first area A1-22 and the second area A2-22 of the third-second portion P3-22, however, the present disclosure should not be limited thereto. According to an embodiment, the length of the first area A1-21 and the second area A2-21 of the third-first portion P3-21 may be the same as the length of the first area A1-22 and the second area A2-22 of the third-second portion P3-22.

In the case where the connection portion CNP-2 includes multiple third portions P3-2, the fourth portion P4-2 may be disposed between the third portions P3-2 adjacent to each other amongst the multiple third portions P3-2. According to the present embodiment, the fourth portion P4-2 may extend from an end of the second area A2-21 of the third-first portion P3-21 to an end of the first area A1-22 of the third-second portion P3-22. The fourth portion P4-2 may extend in the second direction DR2 perpendicular to the first direction DR1.

When the foldable display device DD is folded, a first internal angle $\theta 1\text{-}2$ between the first and third areas A1-21 and A3-21 of the third-first portion P3-21 and a second internal angle $\theta 2\text{-}2$ between the second and third areas A2-21 and A3-21 of the third-first portion P3-21 may increase.

Accordingly, when the foldable display device DD is folded, a distance d1-2 between one end of the first area A1-21 of the third-first portion P3-21, which is adjacent to the first portion P1-2, and one end of the second area A2-21 of the third-first portion P3-21, which is adjacent to the fourth portion P4-2, may increase, and when the foldable display device DD is unfolded, the distance d1-2 between the one end of the first area A1-21 and the one end of the second area A2-21 may decrease.

In addition, when the foldable display device DD is folded, a third internal angle $\theta 3\text{-}2$ between the second area A2-21 of the third-first portion P3-21 and the fourth portion P4-2 and a fourth internal angle $\theta 4\text{-}2$ between the first area A1-22 of the third-second portion P3-22 and the fourth portion P4-2 may increase.

Accordingly, when the foldable display device DD is folded, a distance d2-2 between the second area A2-21 of the third-first portion P3-21 and one end of the first area A1-22 of the third-second portion P3-22, which is adjacent to the third area A3-22, may increase, and when the foldable display device DD is unfolded, the distance d2-2 between the second area A2-21 of the third-first portion P3-21 and the one end of the first area A1-22 of the third-second portion P3-22 may decrease.

As a length of the connection portion CNP-2 in a direction perpendicular to the folding axis FX varies when the display device DD is folded, a tensile stress generated in the connection portion CNP-2 may be reduced. Therefore, the first signal lines SL1 (See FIG. 5A) extending along the connection portion CNP-2 may be prevented from being damaged, and the reliability of the digitizer DTM (See FIG. 5A) may be improved.

Referring to FIG. 7B, the connection portion CNP-3 may include a first portion P1-3, a second portion P2-3, a third portion P3-3, and a fourth portion P4-3. The connection portion CNP-3 may include multiple third portions P3-3 and fourth portions P4-3.

According to the present embodiment, the connection portion CNP-3 may include three third portions P3-3, where each third portion P3-3 may include a third-first portion P3-31, a third-second portion P3-32, and a third-third portion P3-33.

The third-first portion P3-31 may be disposed at a left side of the folding axis FX adjacent to the first sensing portion SP1 (See FIG. 5A). The third-second portion P3-32 may be disposed at a right side of the folding axis FX adjacent to the second sensing portion SP2 (See FIG. 5A).

The third-third portion P3-33 may be disposed between the third-first portion P3-31 and the third-second portion P3-32. A first area A1-33 of the third-third portion P3-33 may be disposed at the left side of the folding axis FX, and a second area A2-33 of the third-third portion P3-33 may be disposed at the right side of the folding axis FX. A third area A3-33 of the third-third portion P3-33 may be disposed to cross the folding axis FX.

First areas A1-31, A1-32, and A1-33 and second area A2-31, A2-32, and A2-33 of the third-first, third-second, and third-third portions P3-31, P3-32, and P3-33 may extend in the first direction DR1. Third area A3-31, A3-32, and A3-33 of the third-first to third-third portions P3-31, P3-32, and P3-33 may extend in the second direction DR2.

According to an embodiment, the third-first, third-second, and third-third portions P3-31, P3-32, and P3-33 may have the same length, however, they should not be limited thereto. According to an embodiment, the third-first, third-second, and third-third portions P3-31, P3-32, and P3-33 may have different lengths from each other.

According to the present embodiment, the connection portion CNP-3 may include two fourth portions P4-3, namely, a fourth-first portion P4-31 and a fourth-second portion P4-32.

The fourth-first portion P4-31 may be disposed between the third-first portion P3-31 and the third-third portion P3-33. The fourth-first portion P4-31 may extend from an end of the second area A2-31 of the third-first portion P3-31 to an end of the first area A1-33 of the third-third portion P3-33.

The fourth-second portion P4-32 may be disposed between the third-second portion P3-32 and the third-third portion P3-33. The fourth-second portion P4-32 may extend from an end of the first area A1-32 of the third-second portion P3-32 to an end of the second area A2-33 of the third-third portion P3-33.

The fourth-first portion P4-31 and the fourth-second portion P4-32 may extend in the second direction DR2.

When the display device DD is folded, internal angles between the first areas A1-31, A1-32, and A1-33 and the third areas A3-31, A3-32, and A3-33 of the third portions P3-3 and internal angles between the second areas A2-31, A2-32, and A2-33 and the third areas A3-31, A3-32, and A3-33 of the third portions P3-3 may increase. In addition, internal angles between the fourth portions P4-3 and the third portions P3-3 respectively extending from both ends of each of the fourth portions P4-3 may increase.

Accordingly, as a length of the connection portion CNP-3 in the direction perpendicular to the folding axis FX varies when the foldable display device DD is folded, a tensile stress generated in the connection portion CNP-3 may be reduced. According to the present embodiment, since the third portions P3-3 are disposed at the left and right sides of the folding axis FX, any variation in length or width of any third portion from other third portions may be reduced. Accordingly, the first signal lines SL1 (refer to FIG. 5A) extending along the connection portion CNP-3 may be prevented from being damaged.

FIG. 7B shows, as a representative non-limiting example, three third portions P3-3, however, four or more third portions P3-3 may be provided. Assuming that "n" third portions P3-3 are provided, (where n is equal to or greater than 3), a third portion P3-3 extending from the first portion P1-3 may be defined as a first third portion, and a third portion P3-3 extending from the second portion P2-3 may be defined as an "n-th" third portion.

In addition, a third portion P3-3 disposed between the first third portion and the "n-th" third portion may be defined as an i-th third portion, (where 2<i<n-1). The "i-th" third portion may be disposed at the left side and the right side of the folding axis FX. In addition, a third area of the "i-th" third portion may be disposed to cross over the folding axis FX.

In the present embodiment, n-1 fourth portions P4-3 may be provided, and each of the fourth portions P4-3 may be disposed between the (i-1)th third portion and the i-th third portion.

Figure 8B:
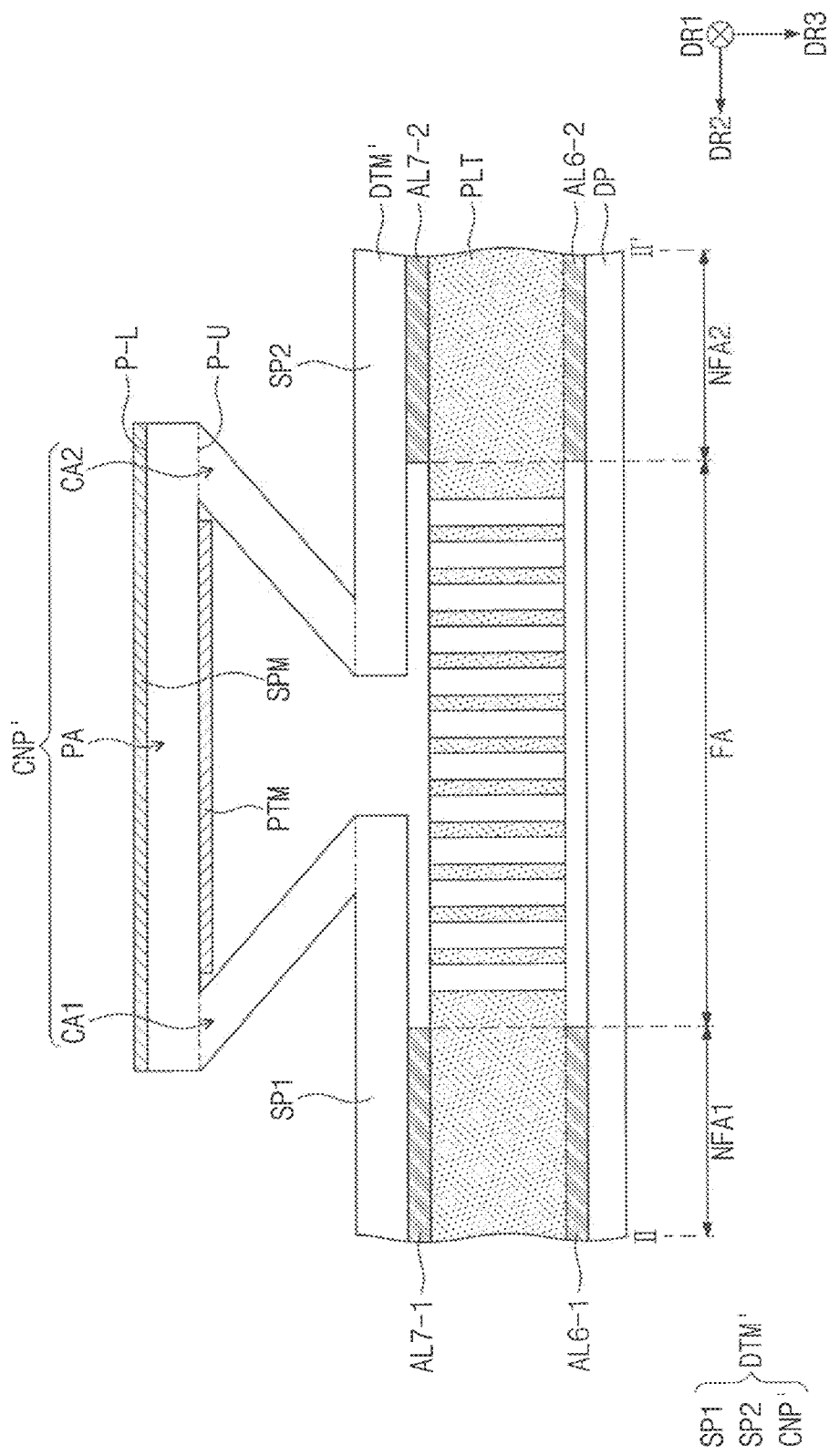
FIG. 8B is an enlarged cross-sectional view of an unfolded state of a portion of a display device according to an embodiment of the present disclosure, taken along a line II-II' of FIG. 8A.

FIG. 8A is a plan view of a digitizer DTM' according to an embodiment of the inventive concept, and FIG. 8B is an enlarged cross-sectional view of a portion of a foldable display device in an unfolded state according to an embodiment of the inventive concept, taken along a line II-II' of FIG. 8A.

Figure 8C:
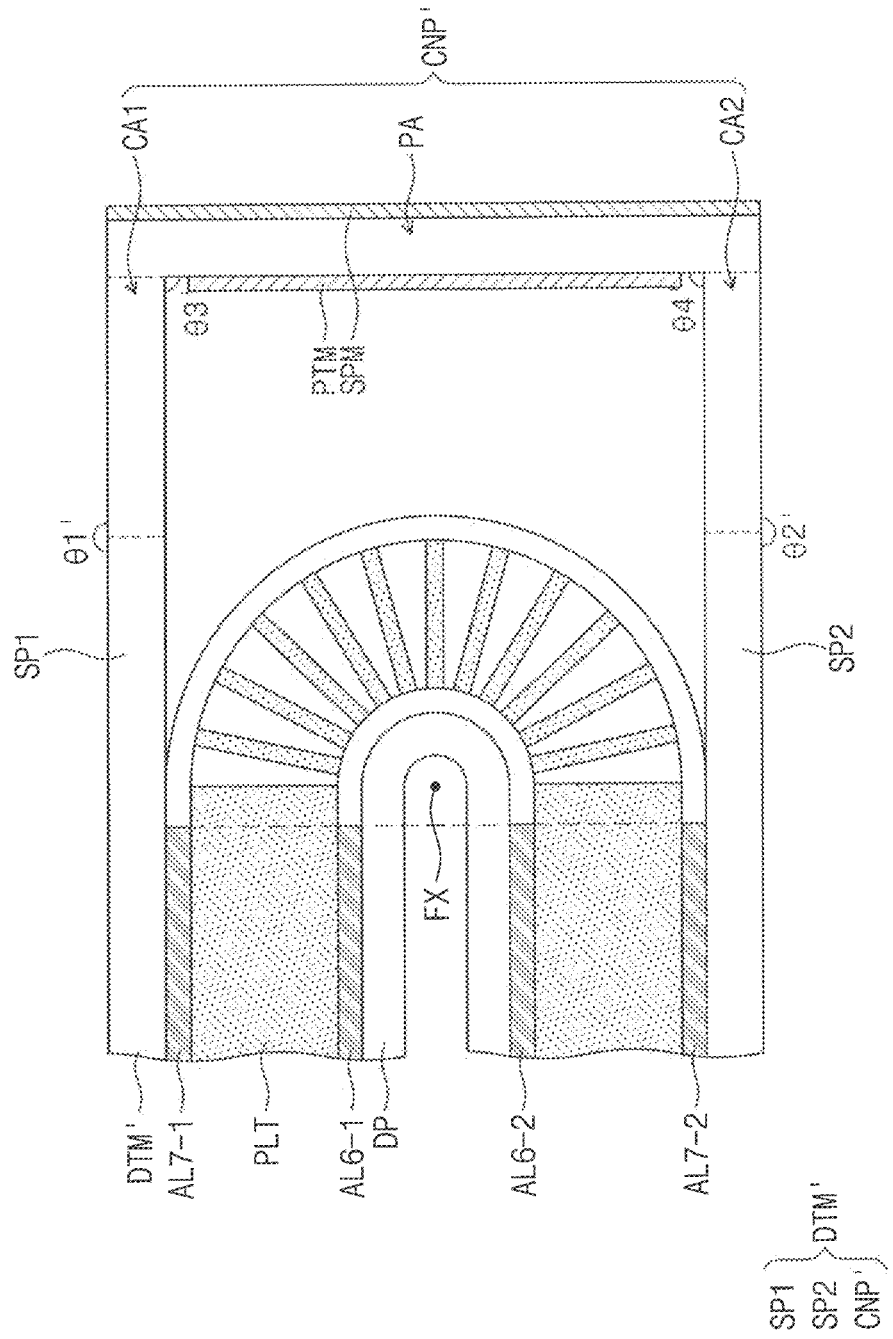
FIG. 8C is an enlarged cross-sectional view of a folded state of a portion of a foldable display device according to an embodiment of the present disclosure.

FIG. 8C is an enlarged cross-sectional view of a portion of a foldable display device in a folded state according to an embodiment of the present disclosure.

Referring to FIGS. 8B and 8C, there is shown enlarged views of a display panel DP, a support layer PLT, sixth adhesive layers AL6-1 and AL6-2 disposed on an upper surface of the support layer PLT, seventh adhesive layers AL7-1 and AL7-2 disposed on a lower surface of the support layer PLT, and the digitizer DTM' of the foldable display device DD, and other components of the foldable display device DD described with reference to FIG. 4 will be omitted.

Referring to FIGS. 8A and 8B, the digitizer DTM' may include a first sensing portion SP1, a second sensing portion SP2, and a connection portion CNP' disposed between the first sensing portion SP1 and the second sensing portion SP2.

The first sensing portion SP1 may overlap a first non-folding area NFA1 and a portion of a folding area FA adjacent to the first non-folding area NFA1, and the second sensing portion SP2 may overlap a second non-folding area NFA2 and another portion of the folding area FA adjacent to the second non-folding area NFA2. The first and second sensing portions SP1 and SP2 may be spaced apart from each other in the folding area FA.

First and second sensing coils RC1 and RC2 (See FIG. 5A) may be disposed in the first sensing portion SP1 insulated from each other at the crossover point Third and fourth sensing coils RC3 and RC4 (See FIG. 5A) may be disposed in the second sensing portion SP2 insulated from each other at the crossover point. Configurations of each of the first sensing portion SP1 and the second sensing portion SP2 are similar to those shown in the plane view of FIG. 5A and those shown in the cross-section view of FIG. 5B, and thus, details thereof are not repeated in FIGS. 8A and 8B.

The connection portion CNP' may extend from one end of the first sensing portion SP1 to one end of the second sensing portion SP2. In particular, the connection portion CNP' may extend from the one end of the first sensing portion SP1 extending in the first direction DR1 and overlapping the folding area FA to one end of the second sensing portion SP2 extending in the first direction DR1 and overlapping the folding area FA.

As shown in FIG. 8B, the connection portion CNP' may include a protruding area PA, a first intermediate area CA1, and a second intermediate area CA2.

The protruding area PA may be spaced apart from the first sensing portion SP1 and the second sensing portion SP2 in a thickness direction of the display panel DP. The protruding area PA may be disposed lower than the first sensing portion SP1 and the second sensing portion SP2.

The protruding area PA may be disposed to overlap the folding area FA and may extend in the second direction DR2. According to an embodiment, the protruding area PA may overlap a portion of the first sensing portion SP1 and a portion of the second sensing portion SP2.

The first intermediate area CA1 may extend from the one end of the first sensing portion SP1 to one end of the protruding area PA. The first intermediate area CA1 may be inclined at an acute angle with respect to each of the first sensing portion SP1 and the protruding area PA. That is, the first sensing portion SP1, the first intermediate area CA1, and the protruding area PA may be arranged to form a Z shape.

The second intermediate area CA2 may extend from the one end of the second sensing portion SP2 to the other end of the protruding area PA. The second intermediate area CA2 may be inclined at an acute angle with respect to each of the second sensing portion SP2 and the protruding area PA. That is, the second sensing portion SP2, the second intermediate area CA2, and the protruding area PA may be arranged to form a Z shape.

The first and second intermediate areas CA1 and CA2 may face each other.

According to an embodiment, a width of the connection portion CNP' may be equal to or greater than about 10 micrometers and equal to or less than about 50 micrometers when viewed in a plane (i.e., the third direction). When the width of the connection portion CNP' is less than about 10 micrometers in the plane, the width of the connection portion CNP' is insufficient to place the first signal lines SL1

(See FIG. 5A). When the width of the connection portion CNP' is greater than about 50 micrometers when viewed in a plane, the folding characteristics of the connection portion CNP' may be reduced.

Referring to FIG. 8C, when the foldable display device DD is folded, a first internal angle θ1' between the first intermediate area CA1 and the first sensing portion SP1 and a second internal angle θ2' between the second intermediate area CA2 and the second sensing portion SP2 may increase. In addition, a third internal angle θ3' between the first intermediate area CA1 and the protruding area PA and a fourth internal angle θ4' between the second intermediate area CA2 and the protruding area PA may also increase.

As an example, the first intermediate area CA1 and the first sensing portion SP1 may be spread out to form a straight line, and the second intermediate area CA2 and the second sensing portion SP2 may be spread out to form a straight line.

According to the inventive concept, when the foldable display device DD is folded, a curved portion of the connection portion CNP' may be spread out to surround the components of the folded display device DD, and a tensile stress generated in the connection portion CNP' may be reduced. Accordingly, the first signal lines SL1 (See FIG. 5A) extending along the connection portion CNP' may be prevented from being damaged.

According to an embodiment, the protruding area PA may include an upper surface P-U adjacent to the first and second sensing portions SP1 and SP2 and a lower surface P-L opposite the upper surface P-U. A protective member PTM may be disposed on the upper surface P-U of the protruding area PA. The protective member PTM may include a polymer material. As an example, the protective member PTM may include polyethylene terephthalate. The protective member PTM may protect the first signal lines SL1 (See FIG. 5A) extending along the protruding area PA.

A reinforcing member SPM may be disposed on the lower surface P-L of the protruding area PA. The reinforcing member SPM may include a metal material. The reinforcing member SPM may support the foldable display device DD such that a shape of the protruding area PA may be maintained when the foldable display device DD is folded.

Figure 9A:
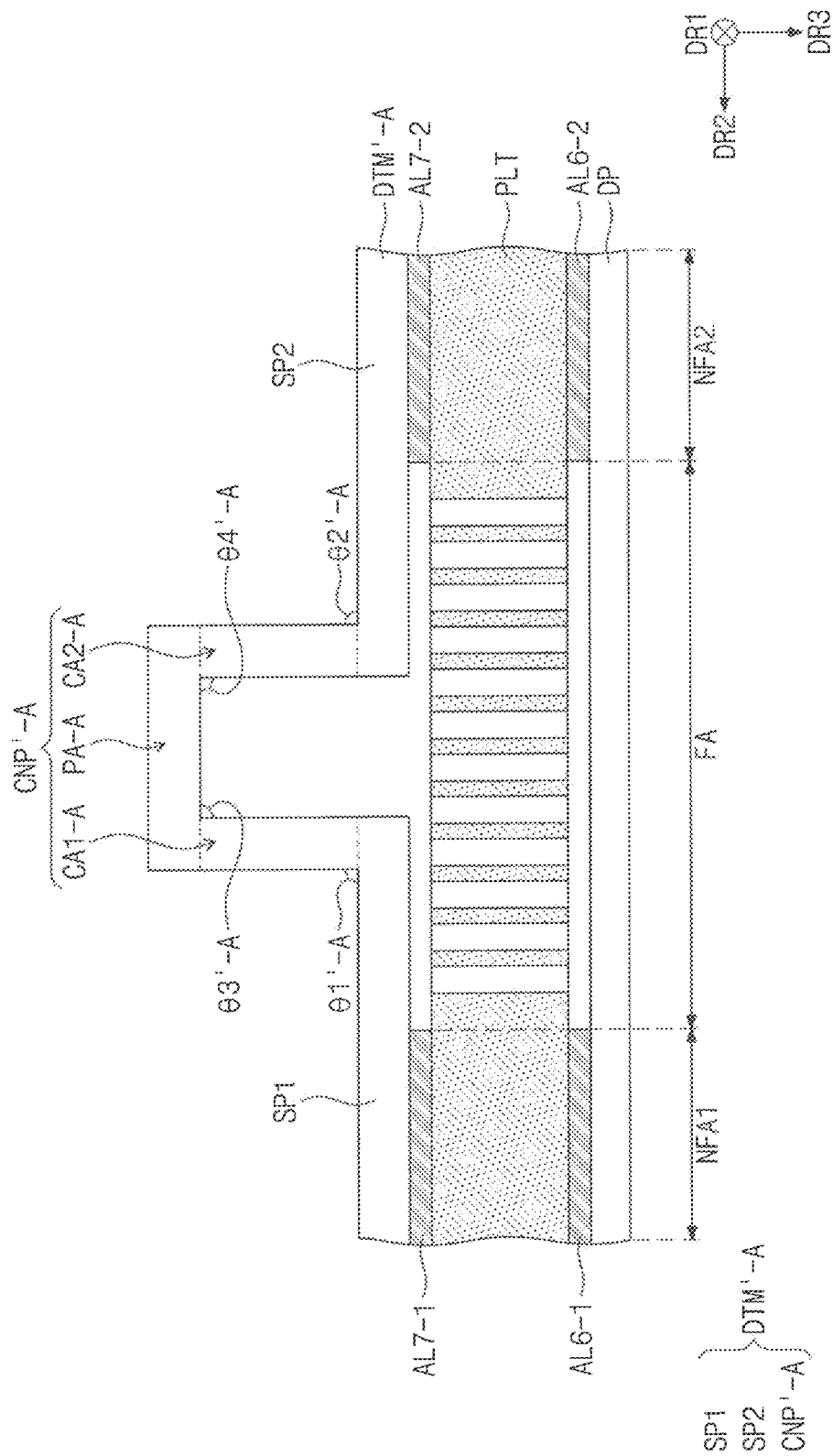
FIG. 9A is an enlarged cross-sectional view of an unfolded state of a portion of a display device according to an embodiment of the present disclosure.
Figure 9B:
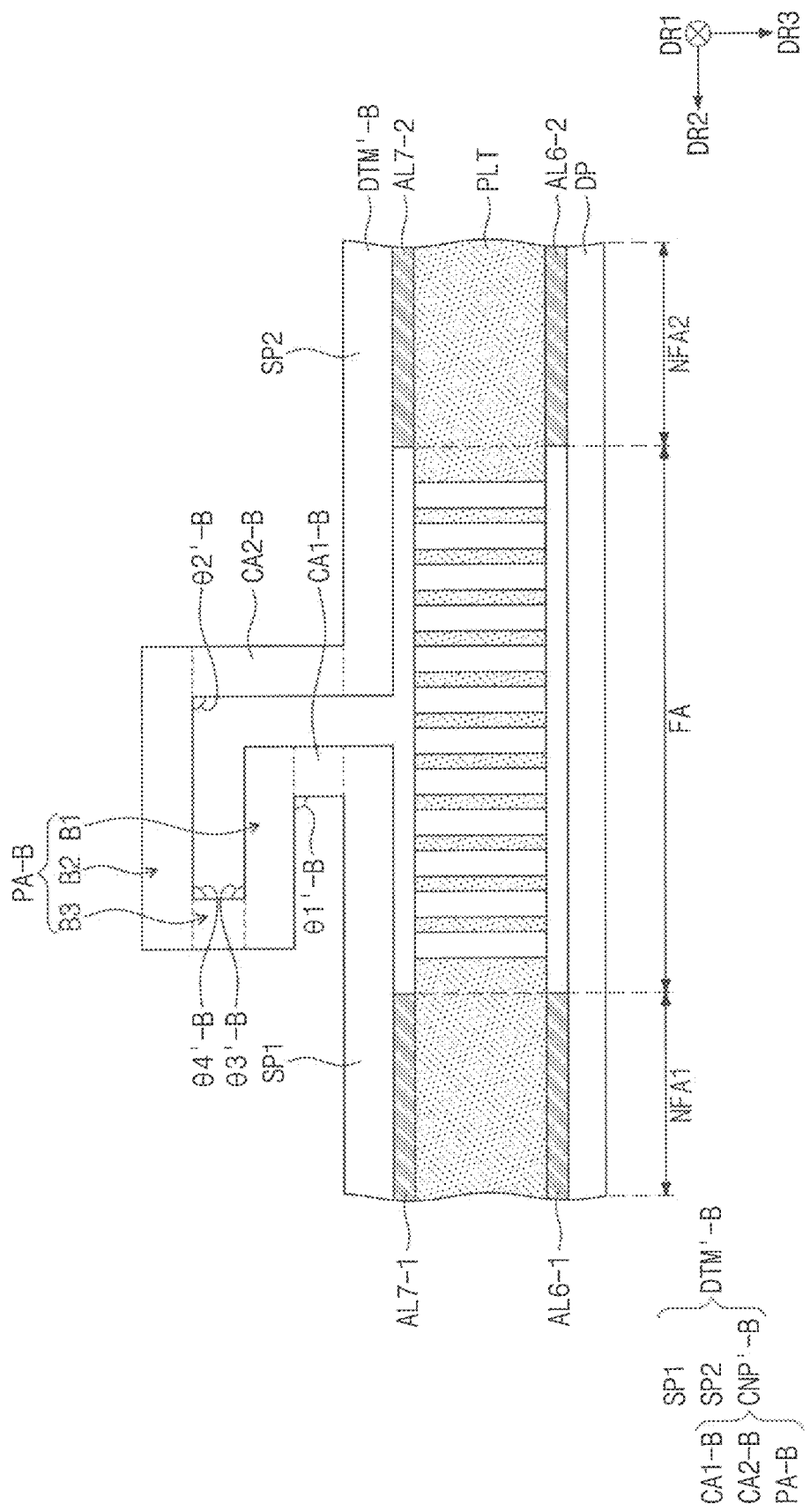
FIG. 9B is an enlarged cross-sectional view of an unfolded state of a portion of a foldable display device according to an embodiment of the present disclosure.

FIG. 9A is an enlarged cross-sectional view of a portion of a foldable display device in an unfolded state according to an embodiment of the present disclosure. FIG. 9B is an enlarged cross-sectional view of a portion of a foldable display device in an unfolded state according to an embodiment of the present disclosure.

Referring to FIGS. 9A and 9B, there is shown enlarged cross-sectional view of a display panel DP, a support layer PLT, sixth adhesive layers AL6-1 and AL6-2 disposed on an upper surface of the support layer PLT, seventh adhesive layers AL7-1 and AL7-2 disposed on a lower surface of the support layer PLT, and digitizers DTM'-A and DTM'-B of the foldable display device DD, and other components of the foldable display device DD described with reference to FIG. 4 will be omitted.

Referring to FIG. 9A, the digitizer DTM'-A may include a first sensing portion SP1, a second sensing portion SP2, and a connection portion CNP'-A disposed between the first sensing portion SP1 and the second sensing portion SP2. The connection portion CNP'-A may include a protruding area PA-A, a first intermediate area CA1-A, and a second intermediate area CA2-A.

The first intermediate area CA1-A and the first sensing portion SP1 may be substantially perpendicular to each other, and the second intermediate area CA2-A and the second sensing portion SP2 may be substantially perpendicular to each other. The first intermediate area CA1-A and the protruding area PA-A may be substantially perpendicular to each other, and the second intermediate area CA2-A and the protruding area PA-A may be substantially perpendicular to each other.

That is, the first intermediate area CA1-A may extend from one end of the first sensing portion SP1 to the third direction DR3, and the second intermediate area CA2-A may extend from one end of the second sensing portion SP2 to the third direction DR3. The protruding area PA-A may extend in the second direction DR2.

According to the inventive concept, when the foldable display device DD is folded, a first internal angle θ1'-A between the first intermediate area CA1-A and the first sensing portion SP1 and a second internal angle θ2'-A between the second intermediate area CA2-A and the second sensing portion SP2 may increase. In addition, a third internal angle θ3'-A between the first intermediate area CA1-A and the protruding area PA-A and a fourth internal angle θ4'-A between the second intermediate area CA2-A and the protruding area PA-A may also increase.

That is, when the foldable display device DD is folded, a curved portion of the connection portion CNP'-A may be spread out to surround the components of the display device DD, and a tensile stress generated in the connection portion CNP'-A may be reduced. Accordingly, the first signal lines SL1 (See FIG. 5A) extending along the connection portion CNP'-A may be prevented from being damaged.

Referring to FIG. 9B, the digitizer DTM'-B may include a first sensing portion SP1, a second sensing portion SP2, and a connection portion CNP'-B disposed between the first sensing portion SP1 and the second sensing portion SP2.

The connection portion CNP'-B may include a first intermediate area CA1-B, a second intermediate area CA2-B, and a protruding area PA-B. According to the present embodiment, the protruding area PA-B may include at least one curved area. In addition, the protruding area PA-B may include areas facing each other.

The first intermediate area CA1-B may extend from one end of the first sensing portion SP1 to the third direction DR3. The first intermediate area CA1-B may extend to a direction away from the display panel DP, i.e., in a downward direction from the first sensing portion SP1.

The second intermediate area CA2-B may extend from one end of the second sensing portion SP2 to the third direction DR3. The second intermediate area CA2-B may extend to a direction away from the display panel DP, i.e., to a downward direction from the second sensing portion SP2.

According to an embodiment, the protruding area PA-B may include a first protruding area B1, a second protruding area B2, and a third protruding area B3.

The first protruding area B1 may extend from the first intermediate area CA1-B to the second direction DR2. The second protruding area B2 may extend from the second intermediate area CA2-B to the second direction DR2. The first protruding area B1 and the second protruding area B2 may face each other in a thickness direction of the display panel DP, i.e., the third direction DR3.

The third protruding area B3 may be disposed between the first protruding area B1 and the second protruding area B2. The third protruding area B3 may extend from one end of the first protruding area B1, which is spaced apart from the first intermediate area CA1-B, to one end of the second protruding area B2, which is spaced apart from the second intermediate area CA2-B. The third protruding area B3 may extend in the third direction DR3.

According to the inventive concept, when the foldable display device DD is folded, a first internal angle $\theta 1'$-B between the first intermediate area CA1-B and the first protruding area B1 and a second internal angle $\theta 2'$-B between the second intermediate area CA2-B and the second protruding area B2 may increase. In addition, a third internal angle $\theta 3'$-B between the first protruding area B1 and the third protruding area B3 and a fourth internal angle $\theta 4'$-B between the second protruding area B2 and the third protruding area B3 may also increase.

That is, when the foldable display device DD is folded, the curved portion of the connection portion CNP'-B may be spread out to surround the components of the folded display device DD, and a tensile stress generated in the connection portion CNP'-B may be reduced. Accordingly, the first signal lines SL1 (See FIG. 5A) extending along the connection portion CNP'-B may be prevented from being damaged.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. A foldable display device comprising:
   a display panel comprising a first non-folding area, a second non-folding area, a folding area folded with respect to a folding axis extending in a first direction, the folding area disposed between the first non-folding area and the second non-folding area; and
   a digitizer disposed below the display panel and comprising a first sensing portion, a second sensing portion spaced apart from the first sensing portion in the folding area, and a connection portion extending from a first end of the first sensing portion to a first end of the second sensing portion, the connection portion comprising:
      a first portion extending from the first sensing portion;
      a second portion extending from the second sensing portion;
      one or more third portions disposed between the first portion and the second portion, wherein each of the one or more third portions comprises a first area, a second area facing the first area, a third area disposed between the first area and the second area; and
      a fourth portion disposed between one of: (a) the first portion and the one or more third portions, (b) the second portion and the one or more third portions, and (c) two adjacent third portions from among the one or more third portions.

2. The foldable display device of claim 1,
   wherein the first sensing portion comprises an upper surface facing the display panel and a lower surface opposite the upper surface, where the first portion adjacent to the first sensing portion is bent in a direction toward the lower surface of the first sensing portion with respect to a bending axis extending in a second direction crossing the first direction, and
   wherein the second sensing portion comprises an upper surface facing the display panel and a lower surface opposite the upper surface, where the second portion adjacent to the second sensing portion is bent in a direction toward the lower surface of the second sensing portion with respect to a bending axis extending in the second direction.

3. The foldable display device of claim 2, further comprising:
   a lower support plate comprising a first support plate disposed below the first sensing portion and a second support plate disposed below the second sensing portion;
   a lower adhesive layer disposed adjacent to a bent portion of the first portion, wherein the first portion is attached to the first support plate by the lower adhesive layer, and
   the lower adhesive layer disposed adjacent to a bent portion of the second portion, wherein the second portion is attached to the second support plate by the lower adhesive layer.

4. The foldable display device of claim 1, further comprising a connector disposed in the second sensing portion, wherein the digitizer further comprises:
   first sensing coils disposed on a first layer;
   second sensing coils disposed on a second layer and insulated from the first sensing coils on the first layer at a juncture where the second sensing coils cross over the first sensing coils, wherein the first sensing coils and the second sensing coils are disposed in the first sensing portion;
   third sensing coils disposed on a third layer;
   fourth sensing coils disposed on a fourth layer and insulated from the third sensing coils on the third layer at a juncture where the fourth sensing coils cross over the third sensing coils, the third sensing coils and the fourth sensing coils being disposed in the second sensing portion; first signal lines connecting the first and second sensing coils to the connector; and
   second signal lines connecting the third and fourth sensing coils to the connector,
   wherein the first signal lines extend from the first sensing portion to the second sensing portion via the connection portion for connection with the connector in the second sensing portion.

5. The foldable display device of claim 4, wherein the first signal lines are disposed in the connection portion having a single-layer structure.

6. The foldable display device of claim 1, wherein a first internal angle between the first area and the third area of the one or more third portions increases when the display panel is changed from an unfolded state to a folded state and a second internal angle between the second area and the third area of the one or more third portions increases when the display panel is changed from the unfolded state to the folded state.

7. The foldable display device of claim 1, wherein the connection portion has a width equal to or greater than about 10 micrometers and equal to or less than about 50 micrometers when viewed in a plane.

8. The foldable display device of claim 1, wherein the third area and the fourth portion extend in a direction substantially perpendicular to the first direction when the first portion and the first area extending from the first portion extend in a same direction and/or when the second portion and the second area extending from the second portion extend in a same direction.

9. The foldable display device of claim 8, wherein when there is a single third portion, the first area extends from the first portion, and the fourth portion extends from the second portion to the second area and crosses the folding axis.

10. The foldable display device of claim 8, wherein the first area of a first third portion from among the one or more third portions extends from the first portion, and wherein the second area of a second third portion from among the one or more third portions extends from the second portion, and wherein the third area of the second third portion from among the one or more third portions crosses the folding axis.

11. The foldable display device of claim 8, wherein the one or more third portions comprise a first third portion extending from the first portion, a second third portion extending from the second portion, and an ith third portion crossing over the folding axis.

12. The foldable display device of claim 1, wherein the third area extends in the first direction when the first portion and the first area extending from the first portion extend in a different direction.

13. The foldable display device of claim 12, wherein the fourth portion comprises:
a first extension portion extending from the second area in a direction substantially perpendicular to the first direction and crossing the folding axis; and
a second extension portion extending from the second portion to the first extension portion along the first direction.

14. The foldable display device of claim 1, wherein the first sensing portion and the second sensing portion comprise:
a base layer;
a first metal layer disposed on the base layer;
a first cover layer disposed on the base layer and covering the first metal layer;
a second metal layer disposed below the base layer; and
a second cover layer disposed below the base layer and covering the second metal layer.

15. The foldable display device of claim 1, further comprising a support layer disposed between the display panel and the digitizer, wherein the support layer comprises a first support portion overlapping the first non-folding area, a second support portion overlapping the second non-folding area, and a folding portion disposed between the first support portion and the second support portion and overlapping the folding area, wherein the folding portion is provided with a plurality of openings arranged in a lattice shape when viewed in a planar direction normal to the first direction and a second direction crossing the first direction.

16. The foldable display device of claim 1, further comprising:
an insulating layer comprising a first insulating portion disposed below the first sensing portion and a second insulating portion disposed below the second sensing portion and spaced apart from the first insulating portion in the folding area; and
a lower support plate comprising a first support plate disposed below the first insulating portion and a second support plate disposed below the second insulating portion and spaced apart from the first support plate in the folding area.

17. A foldable display device comprising:
a display panel comprising a first non-folding area, a second non-folding area, a folding area folded with respect to a folding axis extending in a first direction, disposed between the first non-folding area and the second non-folding area; and
a digitizer disposed below the display panel and comprising a first sensing portion, a second sensing portion spaced apart from the first sensing portion in the folding area, and a connection portion extending from a first end of the first sensing portion to a first end of the second sensing portion, which faces the first end of the first sensing portion,
wherein the folding axis is interposed between the first and second sensing portions,
wherein the connection portion comprises:
a protruding area spaced apart from the first sensing portion and the second sensing portion and protruded in a thickness direction of the display panel;
a first intermediate area extending from the first end of the first sensing portion to the protruding area; and
a second intermediate area extending from the first end of the second sensing portion to the protruding area when the display panel is unfolded.

18. The foldable display device of claim 17, further comprising a connector disposed in the second sensing portion, wherein the digitizer comprises:
first sensing coils;
second sensing coils disposed on a different layer from a layer on which the first sensing coils are disposed on, wherein the second sensing coils are insulated from the first sensing coils where the second sensing coils cross over the first sensing coils,
wherein the first sensing coils and the second sensing coils are disposed in the first sensing portion;
third sensing coils;
fourth sensing coils disposed on a different layer from a layer on which the third sensing coils are disposed on, wherein the fourth sensing coils are insulated from the third sensing coils where the fourth sensing coils cross over the third sensing coils the third sensing coils,
wherein the third sensing coils and the fourth sensing coils are disposed in the second sensing portion;
first signal lines connecting the first and second sensing coils to the connector;
second signal lines connecting the third and fourth sensing coils to the connector, wherein the first signal lines extend from the first sensing portion to the second sensing portion and connect to the connector in the second sensing portion via the connection portion.

19. The foldable display device of claim 17, wherein the protruding area is disposed lower than the first sensing portion and the second sensing portion and extends in a second direction crossing over the first direction, and each of a first internal angle between the first sensing portion and the first intermediate area and a second internal angle between the second sensing portion and the second intermediate area is equal to or less than about 90 degrees.

20. The foldable display device of claim 19, wherein the first internal angle between the first sensing portion and the first intermediate area is increased when the display panel is changed to a folded state from an unfolded state and the second internal angle between the second sensing portion and the second intermediate area is increased when the display panel is changed from to folded stated from the unfolded state.

21. The foldable display device of claim 19, further comprising at least one of a protective member and a reinforcing member, wherein the protruding area comprises an upper surface adjacent to the first and second sensing portions and a lower surface opposite to the upper surface, wherein the protective member is disposed on the upper surface and comprises an organic material, and the reinforcing member is disposed on the lower surface and comprises a metal material.

22. The foldable display device of claim 17, wherein the protruding area further comprises a first protruding area and a second protruding area facing the first protruding area, wherein the protruding area comprises a curved portion and an angle of the curved portion when the display panel is folded is greater than an angle of the curved portion when the display panel is unfolded.

23. The foldable display device of claim 22, wherein the first protruding area extends from the first intermediate area in a second direction crossing over the first direction, the second protruding area extends from the second intermediate area to the second direction and faces the first protruding area in the thickness direction of the display panel, and the protruding area further comprises a third protruding area extending from a first end of the first protruding area, spaced apart from the first intermediate area, to a first end of the second protruding area, spaced apart from the second intermediate area.

24. The foldable display device of claim 17, wherein the connection portion has a width equal to or greater than about 10 micrometers and equal to or less than about 50 micrometers in the first direction when viewed in a cross-sectional plane.

\* \* \* \* \*